US010899934B2

(12) United States Patent
Schreiber

(10) Patent No.: US 10,899,934 B2
(45) Date of Patent: Jan. 26, 2021

(54) EFFECT PIGMENTS COATED WITH ORGANIC BINDERS FOR POWDER PAINTS, AND A METHOD FOR PRODUCING SAID COATED EFFECT PIGMENTS AND THEIR USE

(71) Applicant: ECKART GmbH, Hartenstein (DE)

(72) Inventor: Burkhard Schreiber, Hartenstein (DE)

(73) Assignee: ECKART GMBH, Hartenstein (DE)

( * ) Notice: Subject to any disclaimer, the term of this patent is extended or adjusted under 35 U.S.C. 154(b) by 125 days.

(21) Appl. No.: 16/089,263

(22) PCT Filed: Mar. 30, 2017

(86) PCT No.: PCT/EP2017/000392
§ 371 (c)(1),
(2) Date: Sep. 27, 2018

(87) PCT Pub. No.: WO2017/167450
PCT Pub. Date: Oct. 5, 2017

(65) Prior Publication Data
US 2020/0181423 A1    Jun. 11, 2020

(30) Foreign Application Priority Data

Mar. 30, 2016    (EP) .................................... 16000730

(51) Int. Cl.
| | |
|---|---|
| C09D 5/32 | (2006.01) |
| C08K 9/02 | (2006.01) |
| C09D 167/02 | (2006.01) |
| C09D 5/03 | (2006.01) |
| C09C 1/00 | (2006.01) |
| C09D 5/36 | (2006.01) |

(52) U.S. Cl.
CPC ............ C09D 5/032 (2013.01); C09C 1/0021 (2013.01); C09D 5/36 (2013.01); C09D 167/02 (2013.01); *C09C 2200/1054* (2013.01); *C09C 2200/406* (2013.01); *C09C 2220/103* (2013.01)

(58) Field of Classification Search
CPC ........ C09D 5/032; C09D 5/36; C09D 167/02; C09D 2200/1054; C09D 2200/406; C09D 2220/103; C09D 167/00; C09C 1/0021; C09C 2200/1054; C09C 2200/406; C09C 2220/103; C09C 2200/405; C09C 1/0015; C09C 1/62; C09C 1/644; C09C 1/648; C09C 2200/1058; B65D 25/14; C08L 61/06; C08L 61/28; C08K 9/02; C08K 3/08

USPC ......................................................... 523/209
See application file for complete search history.

(56) References Cited

U.S. PATENT DOCUMENTS

| | | | |
|---|---|---|---|
| 4,217,426 A | 8/1980 | McConnell et al. | |
| 6,384,102 B1 | 5/2002 | Moens et al. | |
| 6,635,721 B1 | 10/2003 | Moens et al. | |
| 6,660,398 B1 | 12/2003 | Moens et al. | |
| 7,578,879 B2 | 8/2009 | Huber et al. | |
| 10,508,214 B2 * | 12/2019 | Takagi ................ | C09D 167/02 |
| 2009/0117281 A1 | 5/2009 | Sato et al. | |
| 2009/0264575 A1 | 10/2009 | Henglein et al. | |

(Continued)

FOREIGN PATENT DOCUMENTS

| | | |
|---|---|---|
| CN | 101595136 A | 12/2009 |
| DE | 1544830 | 4/1970 |

(Continued)

OTHER PUBLICATIONS

International Search Report and Written Opinion for International Application No. PCT/EP2017/000392 dated Sep. 4, 2017.

*Primary Examiner* — Hannah J Pak
(74) *Attorney, Agent, or Firm* — Fitch, Even, Tabin & Flannery, L.L.P.

(57) ABSTRACT

The invention relates to coated effect pigments, wherein the coating comprises a binder which is suitable for powder paints. They comprise a crystalline and an amorphous fraction which is determined by $C^{13}$ NMR MAS relaxation measurements, the relaxation of the $^{13}C$ cores being fitted as a biexponential relaxation according to the formula (II) and the degree of crystallinity c being in a range between 40 to 85%, and relaxation having a short average relaxation time $T_1^S$ and a long average relaxation time $T_1^l$, and $T_1^l$ being in a range of from 65 to 130 s. The effect pigments coated according to the invention have at least one endothermic peak with a maximum from a range of $T_{max}$=100 to 150° C. and an enthalpy ΔH associated with said peak from a range of 15 J/g to 80 J/g in DSC at a feed speed of 5° C./min, the enthalpy being calculated relative to the amount of the binder. The binders are applied to the effect pigment by way of spontaneous precipitation.

Figure 1:
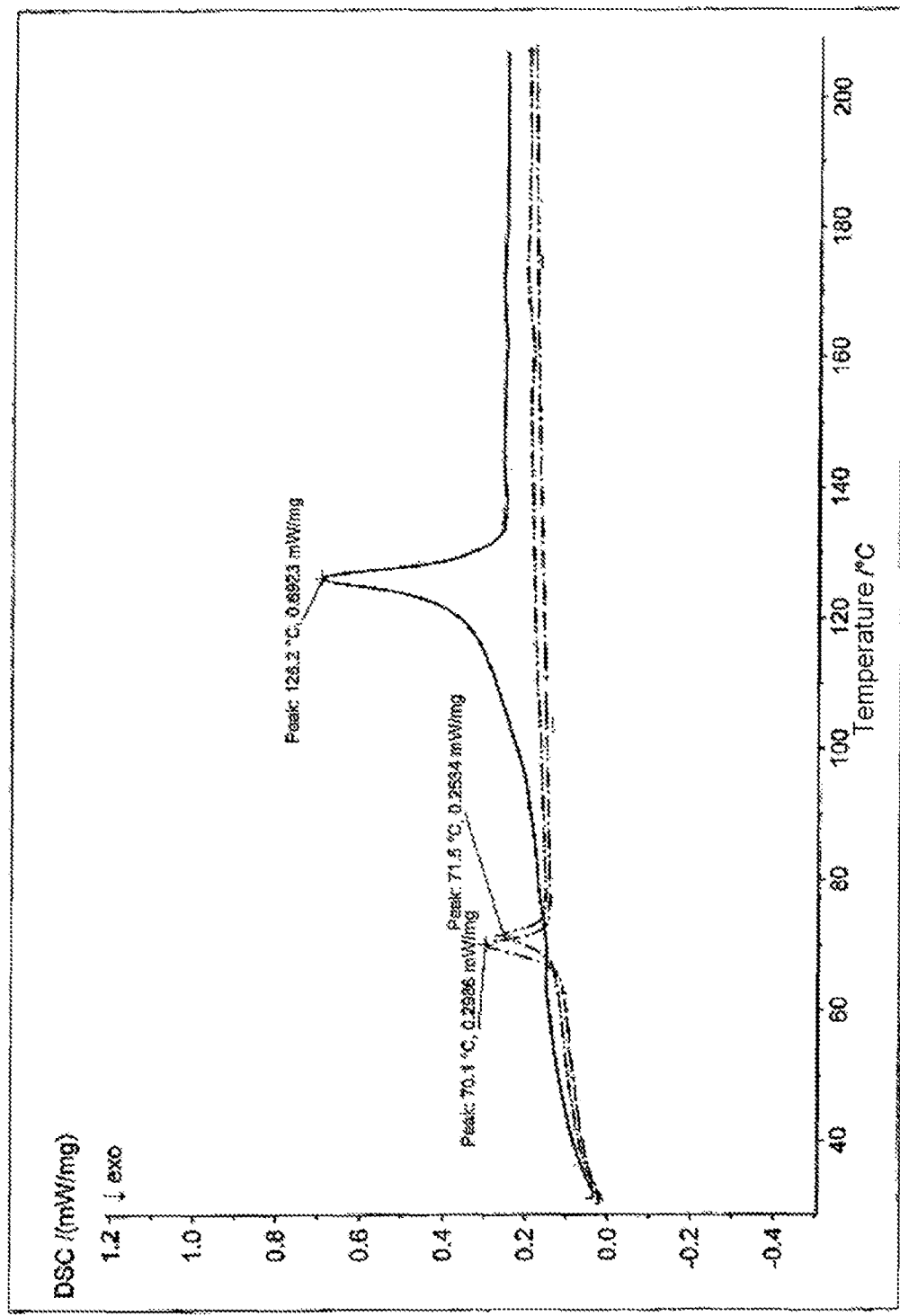

$$M(t, M_0, a, c, T_1^s, T_1^l) = M_0 \cdot \left[ (1-c) \cdot \left( 1 - a \cdot e^{-\left(\frac{t}{T_1^s}\right)} \right) + c \cdot \left( 1 - a \cdot e^{-\left(\frac{t}{T_1^l}\right)} \right) \right] \quad (II)$$

17 Claims, 7 Drawing Sheets

(56) References Cited

U.S. PATENT DOCUMENTS

| | | | |
|---|---|---|---|
| 2010/0095868 A1* | 4/2010 | Kaupp | C09C 1/0024 |
| | | | 106/417 |
| 2010/0099813 A1 | 4/2010 | Gobelt et al. | |
| 2010/0269733 A1* | 10/2010 | Kremitzl | B82Y 30/00 |
| | | | 106/404 |
| 2012/0065298 A1 | 3/2012 | Setoguchi | |
| 2018/0185877 A1 | 7/2018 | Ochi et al. | |
| 2018/0305565 A1 | 10/2018 | Saito et al. | |

FOREIGN PATENT DOCUMENTS

| | | |
|---|---|---|
| DE | 2603211 | 8/1977 |
| DE | 10243438 A1 | 3/2004 |
| DE | 102005032346 A1 | 1/2007 |
| DE | 102008060228 A1 | 6/2010 |
| DE | 102010049642 A1 | 1/2012 |
| EP | 477433 B1 | 4/1994 |
| EP | 0521992 B1 | 6/1996 |
| EP | 1332182 B1 | 6/2004 |
| EP | 1837380 A1 | 9/2007 |
| EP | 1950257 A1 | 7/2008 |
| EP | 2115075 A1 | 11/2009 |
| EP | 1893699 B1 | 1/2010 |
| EP | 1699884 B1 | 2/2010 |
| EP | 2106412 B1 | 6/2010 |
| EP | 2125910 B1 | 3/2011 |
| EP | 2125909 B1 | 4/2011 |
| EP | 2479224 A1 | 7/2012 |
| EP | 2240543 B1 | 8/2012 |
| EP | 2688962 A1 | 1/2014 |
| EP | 2773704 A1 | 9/2014 |
| EP | 2723779 B1 | 1/2015 |
| EP | 2864373 B1 | 12/2015 |
| GB | 1087055 A | 10/1967 |
| JP | H07-277960 A | 10/1995 |
| JP | 2002-012795 A | 1/2002 |
| JP | 2007-515534 A | 6/2007 |
| WO | 2001138432 A1 | 5/2001 |
| WO | 200250201 A1 | 6/2002 |
| WO | 2004083326 A1 | 9/2004 |
| WO | 2004087816 A2 | 10/2004 |
| WO | 2010063430 A1 | 6/2010 |
| WO | 2017/043447 A1 | 3/2017 |
| WO | 2017/119373 A1 | 7/2017 |

\* cited by examiner

EFFECT PIGMENTS COATED WITH ORGANIC BINDERS FOR POWDER PAINTS, AND A METHOD FOR PRODUCING SAID COATED EFFECT PIGMENTS AND THEIR USE

The invention relates to the coating of effect pigments with organic binders by spontaneous precipitation, and also to a method for producing these coated effect pigments and to their use.

Effect pigments are much in use in the pigmentation of paints, varnishes, powder coatings, printing inks, plastics or cosmetics. The introduction and wetting of these pigments into binder systems causes a great deal of problems, particularly in the case of powder coatings.

Effect pigments cannot be incorporated in the usual way—by extrusion and subsequent comminution of the extrudate—into powder coatings as in the case of organic or inorganic chromatic pigments, since these operations would crush the platelet-shaped pigments and cause them to lose their optical effect. Instead, processes referred to as dry-blend or bonding processes are used.

A dry-blend process is a simple mixing operation wherein commercial powder coatings and effect pigments are combined dry with one another. Optionally it is possible for further additives such as flow aids, for example, to be added to the mixing operation. A disadvantage is that, owing to reasons including the different specific weights and the electrostatic charging behavior, dry mixtures of this kind lead to the separation of effect pigments and binders during application of the powder coating. The recyclability of the powder coating, which in and of itself is one of the great advantages of powder coating systems, is no longer possible in the case of powder coatings pigmented with effect pigments and produced by this process.

A bonding process is a mixing operation of a commercial powder coating with effect pigment, in which a physical attachment of the effect pigment particles to the powder coating particles is achieved by heating of the mixture. With the bonding process, therefore, there is an adhesion of the effect pigments to the surface of the powder coating particles. Bonded effect pigments have relatively low alteration of shade, since the separation of powder coating from effect pigment during the application is now greatly reduced. One disadvantage, however, is that the bonding process is a very "artisan" process, requiring a great deal of experience and know-how. For instance, instances of local overheating in the reactor are possible, and then lead to an unwanted hardening reaction on the part of the powder coating. The deposits forming in the reactor must then be removed, at cost and inconvenience. If the deposits are not removed completely, by protective screening downstream of the process, bits may be formed in the coating material. In the bonding process, moreover, depending on the particle size, it is only possible to introduce a maximum of around 7 wt % of effect pigment. Particularly in the case of relatively large pigments (D50>35 µm), these small quantities are often insufficient to achieve an adequate hiding power.

With both the dry-blend and the bonding process, a disadvantage is that the effect pigments are not completely enveloped by the binder and are therefore applied without binder envelopment to a substrate. In the course of the subsequent curing procedure, customarily a baking operation, wetting of these pigments with the binder is incomplete. As a result, for example, metallic effect pigments are not fully surrounded by the binder after the powder coating is cured, and consequently they do not experience optimum protection from corrosion either.

Another disadvantage with bonded effect pigments is that in some cases they have a limited shelf life. Given that the binders in principle are reactive, these products may suffer agglomeration owing to partial onset of binder crosslinking during prolonged standing times, particularly at relatively high temperatures in the summer months or in hot climates, and may therefore no longer be usable.

One alternative to bonded products was proposed in EP 1 699 884 B1 and in EP 1 893699 B1. Here, a reactive binder with the corresponding curing agent is applied by spray drying to the platelet-shaped metallic or pearlescent effect pigments. For this purpose, the components are necessarily dissolved beforehand in a suitable organic solvent. The binder-curing agent system is not cured in the condition of the coating. Instead, curing takes place only after a dry-blend operation together with the powder coating.

These products have the advantages of bonded products and also, in the case of the metallic effect pigments, an improved resistance in relevant chemicals tests and in the mortar test, in comparison to the metal effect pigments employed, and also have particular optical qualities (3D effect) (U. Hirth, A. Albrecht and B. Schreiber, 1 PPCJ December 2008).

Nevertheless, these products suffer from a relatively low shelf life. Additionally, in the production of these pigments, the cost and inconvenience of the production procedure means that only limited quantities can be produced, at relatively high production cost.

There is therefore a need for coated effect pigments which, like bonded products, have a reduced separation of effect pigment and powder coating and which have an improved shelf life relative to the prior art.

DE 10 2008 060 228 A1 or U.S. Pat. No. 7,578,879 B2 described effect pigments coated with LCST and UCST polymers. An LCST polymer is a polymer which is soluble in a solvent at low temperatures and becomes insoluble above a defined temperature. A UCST polymer is a polymer which is soluble in a solvent at high temperatures and becomes insoluble below a certain temperature. These polymers, however, are polymers that have already undergone curing, and are not binders. Moreover, the teaching of these documents includes a subsequent reaction for immobilizing the polymers on the effect pigment surface.

These pigments do not have suitable hiding power, and tend toward agglomeration.

In EP 1332182 B1 the precipitation was described of polymers onto pigments from a dispersion of the pigments with the polymer in a solvent in which the polymers are soluble, by addition of a solvent in which the polymers are insoluble. In DE 2603211, the reverse process was disclosed: A dispersion of a pigment or pearlescent pigment and of a polymer in a solvent with good solubility for the polymer was added to a solvent in which the polymer has poor solubility. Furthermore, a similar process for the use of pigment concentrates in plastics was disclosed in DE 1544830.

These processes, however, do not precipitate crystalline polymer layers. Moreover, on implementation of these precipitation processes, highly agglomerated precipitates are formed which make ongoing processing virtually impossible. In the case of effect pigments, sticky powders are obtained which are poorly suited to application.

Also known are effect pigments, especially metallic effect pigments, coated with polymer layers which are polymerized onto the effect pigments in situ from monomers in a liquid phase. The majority of known systems are or comprise polyacrylates (EP 2479224 A1, US 20120065298 A1, EP 2115075 A1, EP 1950257 A1, EP 1837380 A1, EP 477433 B1). Some of these pigments are coated with a metal oxide layer prior to the coating with polyacrylate (US 20090117281 A1, EP 2688962 A1, EP 2773704 A1). In these cases, polyfunctional acrylate monomers (crosslinkers) are always also used. The polymer layers formed accordingly are noncrystalline. These products exhibit decidedly good chargeability and often high chemical stability in the powder coating. Nevertheless, pigments coated in this way are usually used in the powder coating in a dry-blend process and therefore have the corresponding disadvantages such as excessive separation. Use in a bonding process is awkward, since the additional step of polymerization makes the process unnecessarily complicated and expensive.

There is therefore a need for the provision of coated effect pigments which do not have the disadvantages stated. In particular, the effect pigments are to possess very good shelf life and to exhibit the low separation tendency of bonded pigments.

Furthermore, there is a need for a simple and inexpensive method for producing these pigments.

The objective of the present invention has been achieved through provision of a coated effect pigment comprising a platelet-shaped substrate and a coating applied thereon comprising a binder for powder coating;
characterized,
in that the binder has a crystalline and an amorphous fraction which is determined by means of $^{13}C$ NMR MAS relaxation measurements, the relaxation of the $^{13}C$ nuclei being fitted as a biexponential relaxation according to the formula $$M(t, M_0, a, c, T_1^s, T_1^l) = M_0 \cdot \left[ (1-c) \cdot \left( 1 - a \cdot e^{-\left(\frac{t}{T_1^s}\right)} \right) + c \cdot \left( 1 - a \cdot e^{-\left(\frac{t}{T_1^l}\right)} \right) \right]$$

where the degree of crystallinity c is in a range between 40% to 85% and where there are a short average relaxation time $T_1^s$ and a long average relaxation time $T_1^l$ and where $T_1^l$ is in a range from 65 to 130 s.

Further embodiments of the coated effect pigment are described in dependent claims 2 to 14.

Further embodiments are also described in aspects 2 to 18 and in aspects 37 to 57.

Furthermore, the object has been achieved through provision of a method for producing a coated effect pigment comprising a platelet-shaped substrate and a coating applied thereon comprising a binder for powder coating;
characterized, in that it comprises the following steps:
a1) dissolving a binder which is spontaneously precipitatable in an organic solvent or solvent mixture within a first time span of $t_{sol}$ at a temperature $T_{sol}$,
b1) subsequently adding an effect pigment to the solvent or solvent mixture from a1), with dispersion of the effect pigment,
c1) coating the effect pigment with the binder within a second timespan $t_{insol}$ at a temperature $T_{insol}$, or
a2) dispersing an effect pigment in a solvent or solvent mixture,
b2) subsequently adding a binder which is spontaneously precipitable to the solvent or solvent mixture which has a temperature $T_{sol}$,
c2) coating the effect pigment with a binder within a timespan $t_{insol}$, at a temperature $T_{insol}$, d) removing the coated effect pigment from the solvent or solvent mixture, and
e) optionally drying out the coated effect pigment.

Further embodiments of the method are described in dependent claims 16 to 21.

Further embodiments of the method are also described in aspects 19 to 34.

I Spontaneous Precipitation of Polymers:

The present invention is based on an entirely unexpected effect. This effect is that polymers are initially dissolved in an organic solvent at a defined temperature $T_{sol}$. Dissolution is customarily supported by auxiliary measures such as stirring and/or ultrasound treatment. After a certain timespan $t_{insol}$ however, a precipitate of the polymer is formed in the solution. This process occurs spontaneously, in other words without alteration to external parameters such as, for example, temperature, pH, or as a result of addition of salt or of another solvent.

This behavior is referred to in the context of this invention as "spontaneous precipitation" of the polymer. To the knowledge of the inventor, no such behavior of polymers has been hitherto disclosed.

Also understood as spontaneous precipitation, in accordance with the invention, is when the temperature changes slightly, as a result, for example, of the release of heat of solvation. Slight temperature changes are understood here as changes in the region of 0 to 5° C., preferably 0.5 to 2° C.

Long-established in the prior art, of course, is the precipitation of dissolved polymers as a result of temperature change, change in pH, or through addition of salts (salting out). Also known is precipitation by addition of a solvent in which the polymer has poor solubility to the polymer solution. The latter method is used, for example, in EP 1332182 B1 to coat pigments with organic polymers.

Additionally known are UCST or LCST polymers, with which, however, a temperature change is always mandatory in order to produce precipitation.

The effect of spontaneous precipitation is exploited in the context of this invention in order to coat effect pigments with organic binders. The binders are preferably binders suitable for powder coatings. With particular preference the binders used for this purpose are powder coating binders.

In particularly preferred embodiments the binder used is a binder which is spontaneously precipitatable in an organic solvent at a temperature $T_{insol}$.

The timespan $t_{insol}$ lies, in suitable embodiments, within a range from around half a minute to 48 hours. Within this timespan, at least 50%, preferably 60%, more preferably 70%, very preferably at least 80%, and especially preferably at least 90% of the previously dissolved polymer is precipitated.

Timespans below half a minute, however, are unsuitable for the coating of effect pigments, since the precipitation takes place with insufficient control. For times of more than 48 h, the precipitation procedure is disadvantageous for reasons of cost because of the long batch times.

Preferably, therefore, at least 50%, preferably 60%, more preferably 70%, very preferably at least 80%, and especially preferably at least 90% of the previously dissolved polymer is precipitated in an organic solvent within a timespan $t_{insol}$ from a range from 0.5 h to 12 h and more particularly preferably from a range from 1 h to 10 h, and especially preferably from a range from 2 h to 8 h.

With very particular preference, at least 90% of the binder is precipitated in an organic solvent within a timespan $t_{insol}$ from a range from 2 to 8 h.

Generally it has been observed that the precipitation of the polymers is largely quantitative. In general, 90% to 100%, preferably 92% to 97%, of the dissolved polymers are precipitated again.

The temperature of the spontaneous precipitation, $T_{insol}$ lies preferably in a range from 0° C. to 80° C., more preferably in a range from 10° C. to 70° C., more particularly preferably in a range from 15° C. to 50° C., and especially preferably in a range from 18° C. to 30° C. Precipitation takes place more quickly at lower temperatures than at higher temperatures.

The solvent used for the dissolution ought not to be too apolar. Thus in apolar solvents such as carbon tetrachloride, for example, it has been observed that binders can dissolve, but not that they precipitate again.

Preferred organic solvents are solvents from the group of ketones and esters. Particularly preferred solvents are acetone, methyl ethyl ketone (MEK), ethyl acetate, and also mixtures thereof.

While the dissolution of the polymers prior to the spontaneous precipitation did take place without visible residues, the solutions always have a certain opacity, suggesting the presence of a colloidal state as a result of aggregation of the dissolved polymer. In apolar solvents such as carbon tetrachloride, for example, in which spontaneous precipitation did not occur, clear solutions were obtained, conversely.

In preferred embodiments, the binder has polyester functions. In particularly preferred embodiments the binder is a polyester which can be used as a powder coating binder. Binders of this kind are prepared via melt polymerization. In such a case, the monomers (monomers containing carboxylic acid functions, as acid component, and monomers containing alcohol functions, as alcohol component) are brought to the melt state and oligerimized or polymerized by polycondensation in the presence of suitable catalysts. Polyesters are formed which may have hydroxyl groups or carboxylic acid groups as terminal functional groups. These polyesters are of course not fully cured, since, indeed, they are required to cure further as binders in the powder coating after the coating operation, when the coating is baked. Examples relating to the preparation of such polyesters are found in EP 0521992 B1, U.S. Pat. No. 6,660,398 B1, U.S. Pat. No. 6,635,721 B1, WO 2001/138432 A1, U.S. Pat. No. 6,384,102 B1, WO 2004/083326 A1, and WO 2002/50201 A1.

In further preferred embodiments, the polyester comprises as acid component a main part of monomers of the group consisting of isophthalic acid and terephthalic acid and mixtures thereof. In particularly preferred embodiments, the binder comprises as acid component at least 14 mol % of isophthalic acid, based on all the acid components.

The fraction of isophthalic acid and terephthalic acid is preferably 50 to 100 mol % and more preferably 70 to 96 mol %, based on all the acid components.

Further acid components, preferably not included as the main part, there may be adipic acid, phthalic acid, succinic acid, glutaric acid, pimelic acid, azelaic acid, sebacic acid, fumaric acid, maleic acid, 1,3-cyclohexanedicarboxylic acid, 1,4-cyclohexanedicarboxylic acid, and mixtures of these compounds present. Also present in small amounts (below 10 mol %) as branching units may be carboxylic acids with a functionality of three or more, such as trimellitic acid or pyromellitic acid.

With regard to the alcohol components of the polyester binder, preferred embodiments are those featuring as alcohol component a main fraction of neopentyl glycol and/or 2-butyl-2-ethyl-1,3-propanediol. The fraction of neopentyl glycol and/or 2-butyl-2-ethyl-1,3-propanediol is preferably 50 to 100 mol %, more preferably 70 to 98 mol %, and very preferably 80 to 95 mol %, based on all the alcohol components. With very particular preference here neopentyl glycol is the main alcohol component.

Polyester binders with alcohol contents of this kind tend to be assigned in the literature to the "amorphous" polyesters (U.S. Pat. No. 6,660,398 B1, U.S. Pat. No. 6,635,721 B1).

As further alcohol components, preferably at total less than 50 mol % of all the alcohol components, there may be, for example, ethylene glycol, 1,3-propylene glycol, 1,4-butanediol, 1,6-hexanediol, 2-methy-1,3-propanediol, 1,4-cyclohexanedimethanol, hydrogenated bisphenol A, neopentyl glycol hydroxypivalate, and mixtures of these compounds present.

Also present in small amounts (below 10 mol %) as branching units may be hydroxylated compounds having a functionality of three or more, containing at least three hydroxyl groups, such as, for example, trimethylolpropane, ditrimethylolpropane, pentaerythritol, and mixtures thereof.

In further-improved embodiments, with regard to the alcohol components of the polyester, the molar ratio of linear α,ω-alcohols such as, for example, ethylene glycol to neopentyl glycol and/or 2-butyl-2-ethyl-1,3-propanediol is below 20%, more preferably below 15%, even more preferably below 12%, and very preferably below 10%. Polyesters having too high a level of linear α,ω-alcohols such as ethylene glycol, for example, have proven to be less suitable for the spontaneous precipitation.

Polyesters of these kinds are known in the literature as more "amorphous" polyesters. Polyesters having a high proportion of more symmetrical monomers such as, for example, linear α,ω-alcohols, and/or having a high fraction of terephthalic acid, are known in the literature as "semicrystalline" polymers (EP 0 521 992 B1, U.S. Pat. No. 4,217,426).

The spontaneous precipitation of the polymers is attributable to an increased crystallization of the polymers that begins after the polymers have been dissolved in the solvent. This fact will be shown below using various measurement methods.

Without being tied to a theory, the explanation for this, particularly in the case of the polyester binders suitable for powder coating, is that these polyesters, while they may indeed already have certain partial crystallinities, owing to their preparation from the melt, nevertheless have very great steric strain. As a result of dissolution, the polymer chains require greater freedom of movement, and it is possible for suitable polymer segments to find one another and form crystalline regions. Ultimately, therefore, the polymer becomes insoluble and precipitates.

Remarkably, and completely surprisingly, this occurs without further alteration of external parameters.

This is especially striking in the case of polyesters with a high fraction of neopentyl glycol as alcohol component and/or with a high fraction of isophthalic acid as acid component, since these binders in particular have been described in the literature as amorphous polyesters (U.S. Pat. No. 6,660,398 B1, EP 0521992 B1).

II Characterization of the Polymers

IIa DSC Measurements:

Differential Scanning Calorimetry (DSC) is a standard method for analyzing polymers. On the basis of the specific energy of endothermic melt peaks it is possible to estimate the degree of crystallinity. For determining a precise degree of crystallinity, however, standardization on the basis of known polymers with similar structure is always necessary.

The position of melt peaks is determined in this invention primarily through the temperature maximum $T_{max}$. The polymers precipitated in accordance with the invention may also have melt peaks with a plurality of maxima. In that case, $T_{max}$ is selected for the highest peak; if two peaks have largely the same intensities (+/−5%), the mean of the two maxima is taken.

The effect pigments coated with binders in accordance with the invention exhibit in a DSC diagram at a rate of advance of 5° C./min preferably at least one endothermic peak having a maximum from a range of $T_{max}$=100 to 150° C. and also an enthalpy ΔH associated with this peak from a range from 15 J/g to 80 J/g, the enthalpy being calculated on the amount of the binder.

This endothermic peak is assigned to the melting of the crystalline fractions of the binder. With further preference, $T_{max}$ is situated in a range from 110 to 140° C. Preferably, moreover, the enthalpies of fusion are situated in a range of 20-70 J/g and more preferably in a range of 30-65 J/g, the enthalpy being calculated on the amount of the binder.

The positions $T_{max}$ of the enthalpies of fusion are striking in the case of polyester binders. If a DSC is taken of the unprecipitated binders, the first DSC run, in the case of the preferred polyester binders, includes a very small peak with a $T_{max}$ of around 65 to 72° C. This peak may well be attributable to certain small fractions of crystalline regions of the polymer.

Accordingly, the effect pigments coated with binder in accordance with the invention exhibit an increase in the enthalpy of fusion in the DSC, $\Delta T_{max}$, of the crystallized state, in comparison to the uncrystallized state, from a range from 40 to 75° C. and preferably from a range from 50 to 70° C.

The level of the enthalpies of fusion of the unprecipitated binders, preferably polyester binders, $\Delta H_{AGM}$, is in a range of only around 5 to 10 J/g.

Accordingly, the effect pigments coated with binder in accordance with the invention have a ratio of the endothermic enthalpies of fusion $\Delta H/\Delta H_{AGM}$, which can be determined by means of the run of a DSC measurement at a rate of advance of 5° C./min and which are based on the amount of binder, after the precipitation (ΔH), in relation to the binder before the precipitation ($\Delta H_{AGM}$), in a range from 2 to 10. Preferably this ratio lies in a range from 3 to 8 and especially preferably in a range from 4 to 7.5.

IIb Powder Diffractometry (PXRD):

Powder diffractometry in the Debye-Scherrer geometry is a customary method of determining the degree of crystallinity of polymers. A prerequisite is that the sample is present in statistical distribution spatially and as far as possible has no preferential directions. This method can only be used to detect crystalline fractions above a certain size, since there is no diffraction if crystallites are too small.

The PXRD diffractograms are preferably recorded in the Debye-Scherrer geometry with a capillary of 0.3 mm in diameter, using Cu Kα1 as x-ray source and germanium (111) with a slit width of 0.5 mm as monochromator.

All of these parameters influence the width of the peaks obtained.

Effect pigments coated in accordance with the invention here have structured diffractograms. The peaks in this case may be assigned to the (semi)crystalline binder. These peaks have full widths at half maximum in the range from 0.7 to 2.0° (in 2θ).

The unprecipitated polymers, conversely, do not produce structured spectra.

IIc $^{13}$C MAS NMR Spectroscopy and Relaxation:

Because the NMR relaxation measurement of solids, while being well known in the scientific literature for the characterization of crystalline and amorphous fractions of polymers, is nevertheless mentioned less frequently in the patent literature, a general description of the method is given first of all.

Mas Spectroscopy:

For solid-state NMR spectroscopy, the influence of strong nucleus-nucleus interactions, which influence the spectrum, is characteristic. In liquid-state NMR, these interactions are largely averaged out by the Brownian motion. This results in narrow resonance lines, from which in-depth information can be derived about the chemical composition of the sample under analysis. For materials in condensed phase (solid state), where solid structures are present, the Brownian motion is weak or wholly absent. Accordingly, the interactions of the spins are always present, resulting in structureless, very broad NMR spectra. Among these interactions, the greatest part is played by the dipolar interaction, the chemical shift anisotropy, and quadrupole interactions. Given that the quadrupole interactions are relevant only for nuclei having a nuclear spin I>1, they can be disregarded in the case of $^{13}$C NMR (analogously to $^1$H, for $^{13}$C the spin=½).

Chemical shift anisotropy (CSA for short) describes the difference in the chemical shift of the NMR signal between isotropic and anisotropic states. The chemical shift is known to be a measure of the local magnetic field of a particular atomic nucleus, producing a defined magnetic moment. In liquid-state NMR, the chemical shifts of polymers are usually averaged values of all the possible conformations, owing to the rapid changes in conformation around the chemical bonds of the polymer. In solids, the chemical shift—that is, the interaction between the nuclear spin and the electrons in the molecular orbitals—is influenced by any structural change. It therefore contains valuable information not only about the chemical identities but also, in addition, about molecular orientations of the molecular groups involved.

The dipolar interactions, also called dipolar couplings, describe the direct interactions of two spins with magnetic moment. In the case of a $^{13}$C nucleus and of a proton ($^1$H) bonded to it, the dipolar coupling is dependent on the distance r ($\sim 1/r^3$) and on its orientation (θ) relative to the external magnetic field $B_0$ [Isao Ando, Tetsuo Asakura, Solid State NMR of Polymers, vol. 84].

In order to reduce these effects, a new method was presented in 1958 by Andrew et al. [E. R. Andrew, A. Brandbury, R. G. Eades, Nature 1959, 183, 1802.]. This new technique (MAS for magic angle spinning) involved measuring the sample in a ceramic rotor rotating at a particular angle $\theta_m$, the "magic" angle, the rotational frequency $v_{rot}$ being ~1 kHz to 70 kHz. The magic angle, $\theta_m$, is that angle between the axis of rotation and the external magnetic field $B_0$ at which the term representing the average spatial orientations, $\cos^2 \theta_m = \frac{1}{3}$, is valid. The exact angle is 54.74°. At this angle, spin interactions which broaden the NMR lines are partially averaged out, with a consequent marked reduction in the line width. This width, however, is still around 10 to 100 times the line width of corresponding signals in liquid-state NMR. In geometric terms, the magic angle can be described as the angle of the diagonal to the edge of a cube. Characteristic for an MAS NMR spectrum is the presence of a central line at the position of the isotropic chemical shift, and also of side bands, referred to as the "rotational sidebands" (ssb). The rotational sidebands (ssb)

always appear at integral multiples of the rotational frequency $v_{rot}$. They are always labeled with a superscript asterisk (*) in the spectrum.

In the case of a polymer sample with numerous resonances, the overlaps of the rotational sidebands with the actual signals of the chemical shifts of various chemical groups make it more difficult to evaluate the recorded spectra. Customarily, therefore, a rotational frequency is used at which at least the central lines of relevant chemical groups are free from overlaps. In this case, customarily, higher rotational frequencies remove the rotational sidebands from the spectrum. For groups with large chemical anisotropic shift (for example, for polymers with COO groups), high rotational frequencies are used and/or specific techniques for suppressing the rotational sidebands [W. T. Dixon, *J. Chem. Phys.*, 77, 1800 (1982); O. N. Antzutkin, Z. Song, X. Feng, and M. H. Levitt. *J. Chem. Phys.*, 100, 130 (1994)].

In general, rotational frequencies of several kHz up to 20 kHz are sufficient to average out the dipolar interactions between $^{13}C$ nuclei and protons bonded to them. Dipolar interactions between $^{1}H$ nuclei with one another are even stronger, and hence it is necessary to use higher rotational frequencies of up 70 kHz. Because of this, $^{1}H$ MAS solid-state NMR necessitates extremely high cost and complexity of materials, and is consequently seldom used. In the case of polymers, $^{13}C$ MAS NMR has for some considerable time emerged as being sensitive enough to analyze structures and dynamic processes. Since $^{13}C$ nuclei have a much lower natural frequency than $^{1}H$ nuclei, customary techniques involve the magnetizations of the more frequent species (in the case of polymers, therefore, usually $^{1}H$) to the rare species ($^{13}C$). One of the most commonplace techniques in this area is the Hartmann-Hahn cross-polarization, where magnetizations of the excited proton nuclei are transferred to the $^{13}C$ nuclei. In this case it is possible to achieve a factor of 4 as the maximum increase in the sensitivity, as given by the gyromagnetic ratio in nuclei involved ($\gamma_H/\gamma_C$) [S. R. Hartmann, E. L. Hahn, *Phys. Rev.* 1962, 128, 2042].

In a crystal, the molecules are present in inequivalent positions or frozen conformations. The solid-state MAS NMR spectrum here will have more signals with slightly altered chemical shifts, whereas in a solution-state NMR the signals would be equivalent. This effect can be used in solid-state NMR to analyze tautomerism and its dynamic changes [F. Laupretre, L. Monnerie, J. Virlet. *Macromolecules* 17 (1984) 1397].

For amorphous polymer samples below the Tg, the relatively great disorder of the chains will bring about broader NMR bands than in the case of crystalline samples. The differences between the broad NMR signals for the amorphous phases and narrower signals for the crystalline phases can be used to determine the degree of polymerization of the polymers [Isao Ando, Tetsuo Asakura, Solid State NMR of Polymers, vol. 84]. Given that the chain conformations are different in amorphous and in crystalline phases of the polymers, their NMR spectra and their dynamic NMR behavior will also be different. For semicrystalline polymers, the dynamic behavior can be employed as a criterion for distinguishing between the behavior of the amorphous phase, with highly mobile chains, and that of the crystalline phase, with greatly restricted freedom of movement of the chains. One of the methods which is used intensively is the $T_1$ longitudinal relaxation technique [W. S. Veeman. E. M. Menger. H. H. C. de Moor, Proc. IUPAC I.U.P.A.C. *Macromol. Symp.* 28rh. 1982. 2; F. C. Schilling, F. A. Bovery, A. E. Tonelli. *Polym. Marer. Sci. Eng.* 50 (1984) 256, D. A. Torchia. *J. Magn. Reson.* 30 (1978) 613.].

$^{13}C$ Mas Nmr Relaxation:

The longitudinal relaxation or spin-lattice relaxation is the mechanism which describes the development of the magnetization vector in a spin system through to the equilibrium which obtains when the magnetization vector is parallel with the external field $B_0$. Through a suitable $90_x°$ pulse, the macroscopic magnetization $M_0$ in the rotating coordinate system, which by definition points in the equilibrium state in the z-direction (parallel to the external magnetic field), is shifted into the y'-direction. The occupancy ratios of the energy levels effected change in that an equioccupancy takes place, rather than the occupancy in accordance with a Boltzmann distribution that applies in the state of rest. Subsequently there is a relaxation into the equilibrium state in accordance with an exponential function with the time constant $T_1$.

Owing to the high mobility of the chains in the amorphous phase, $T_1$ is substantially shorter than the relaxation time in the crystalline phase. The result of this effect is that in the case of a semicrystalline polymer, the relaxation curve can no longer be described by a simple exponential function of the following type [Bloch F. *Phys. Rev.* 1946; 70: 460-474.]:

$$M(t) = M_0 \left(1 - e^{-\frac{t}{T_1}}\right). \tag{I}$$

Instead, it is necessary here to use a biexponential function, so as to separate the rapid relaxation time $T_1^s$ of the amorphous fraction from the slow relaxation time $T_1^l$ of the crystalline fraction:

$$M(t, M_0, a, c, T_1^s, T_1^l) = \tag{II}$$
$$M_0 \cdot \left[(1-c) \cdot \left(1 - a \cdot e^{-\left(\frac{t}{T_1^s}\right)}\right) + c \cdot \left(1 - a \cdot e^{-\left(\frac{t}{T_1^l}\right)}\right)\right]$$

Here, the following assignations are valid:

$M_0$: equilibrium magnetization
$M(t,M_0,a,c,T_1^s, T_1^l)$: magnetization at the time t
c: proportion of the crystalline polymer as a mole fraction
t: time after the 90° impulse
a: this parameter takes account of nonzero initial magnetizations, and is irrelevant for the determination of the crystalline fraction in the polymers and coated Al particles. Parameter a reflects the efficiency of the saturation block and of the baseline correction, and ought to be close to 1.0 in the case of complete elimination of the magnetization at t=0.
$T_1^s$: spin-lattice relaxation time "short": relaxation time of amorphous fractions
$T_1^l$: spin-lattice relaxation time "long": relaxation of crystalline fractions Suitable waiting times are inserted between the 90° pulses.

Overall, this method is very sensitive in relation to the detection of crystalline fractions of a polymer. Because the method must always be interpreted molecularly, even very small crystalline domains in the polymer can be detected.

IId $^{13}C$ NMR MAS Measurements on Polymers and on Inventively Coated Effect Pigments The experimental details of the measurements to be conducted are found in the experimental section.

A feature of the effect pigments coated in accordance with the invention is that the binder has a crystalline and amorphous fraction which is determined by means of $^{13}C$ NMR MAS relaxation measurements, the relaxation of the $^{13}C$ nuclei being fitted as a biexponential relaxation according to the formula $$M(t, M_0, a, c, T_1^s, T_1^l) = M_0 \cdot \left[ (1-c) \cdot \left( 1 - a \cdot e^{-\left(\frac{t}{T_1^s}\right)} \right) + c \cdot \left( 1 - a \cdot e^{-\left(\frac{t}{T_1^l}\right)} \right) \right] \quad (II)$$

where the degree of crystallinity c is in a range between 40% to 85% and where there are a short average relaxation time $T_1^s$ and a long average relaxation time $T_1^l$ and where $T_1^l$ is in a range from 65 to 130 s.

In other embodiments, the binder has a degree of crystallinity c of 45% to 75%.

In preferred embodiments, the long average relaxation time $T_1^l$ is in a range from 70 to 110 s, more preferably in a range from 71 to 100 s.

III Effect Pigments:

The effect pigments are taken from the group consisting of metallic effect pigments, pearlescent pigments, and interference pigments, and also mixtures thereof.

The metallic effect pigments are based on a platelet-shaped metal core. A metal core referred to as platelet-shaped here is a core whose aspect ratio, i.e., the ratio of average size $d_{50}$ to average thickness $h_{50}$, is greater than 5. Further preferred are metal cores having an aspect ratio of 10 to 500 and of 40 to 100.

Metal cores with a higher aspect ratio have better metallic properties such as light-dark flop or luster.

In accordance with the invention it is preferred for the platelet-shaped metal core to comprise or consist of metals from the group consisting of aluminum, copper, zinc, tin, gold bronze, brass, iron, titanium, chromium, nickel, silver, gold, steel and also alloys and mixtures thereof. According to a further variant in accordance with the invention, the platelet-shaped metal core is an aluminum pigment or gold bronze pigment. Aluminum pigments are particularly preferred.

The metallic effect pigments are either platelet-shaped and substantially circular (of a type referred to as "silver dollar"), or platelet-shaped and substantially "cornflake like" (of the type referred to as "cornflake").

The platelet-shaped metal core of the metallic effect pigments of the invention, i.e., without subsequent polymer coating, preferably possesses an average thickness $h_{50}$ of around 20 nm to around 2 μm, more preferably of 25 nm to 1 μm, and more preferably still of 30 nm to 600 nm.

The $h_{50}$ value relates to the cumulative frequency distribution of the thickness distribution. The thickness distribution may be determined by means of SEM measurements on 70 to 100 pigments by the method described in WO 2004/087816 A2 (pages 24 and 25).

The sizes of the effect pigments of the invention are determined customarily by means of laser granulometry. This analysis produces a cumulative frequency distribution of the volume-averaged size distribution function. In this context, the $D_{50}$ value indicates that value at which 50% of the measured effect pigments have a volume-average diameter which is the same as or less than the particular value indicated. The scattered light signals are evaluated according to the Fraunhofer theory, which also includes refraction and adsorption behaviors of the particles. The size distribution is measured preferably using the Cilas 1064 instrument from Quantachrome.

The $D_{50}$ values of the size distribution of the effect pigments of the invention are preferably in a range from 3 to 200 μm, more preferably in a range from 5 to 100 μm, and very preferably in a range from 8 to 90 μm.

In further embodiments, the platelet-shaped substrate is a metallic effect pigment coated with a metal oxide, or is a pearlescent pigment.

The metal oxide here is taken preferably from the group consisting of silicon (di)oxide, silicon oxide hydrate, silicon hydroxide, aluminum oxide, aluminum oxide hydrate, aluminum hydroxide, and mixtures thereof. Particularly preferred is silicon dioxide ($SiO_2$).

Metallic effect pigments precoated in this way with a metal oxide were substantially easier to coat in accordance with the invention with the binder suitable for powder coating. Moreover, the metal oxide coating contributes to improved chemical stability and/or gassing stability on the part of the overall effect pigment.

The metal oxide preferably has a geometric layer thickness of at least 10 nm. Below this layer thickness, the chemical stability will not be sufficient.

The preferred maximum layer thickness of the metal oxide is 200 nm, preferably 50 nm.

At layer thicknesses above 200 nm, the optical properties of the effect pigment may become disadvantageous.

In one particularly preferred embodiment, the platelet-shaped substrate is an $SiO_2$-coated aluminum effect pigment.

In a development in accordance with the invention, the metal pigment may be precoated with a substance which enhances the adhesion between the surface of the effect pigment and the powder coating resin precipitated onto it. Possible examples of this substance include functionalized silanes, functionalized polymers, and organophosphorus compounds.

Preference is given to using functionalized silanes. These silanes preferably possess the general formula (III)

$$(Y)R_{(4-z)}Si(X)_z \quad (III)$$

In the silane compound of formula (III), z is an integer from 1 to 3, R is a substituted or unsubstituted, unbranched or branched alkyl chain having 1 to 12 C atoms, Y is a functional group which is able to react with corresponding functionalities of the precipitated polymer, and X is a halogen and/or alkoxy group. R may also be joined cyclically to Si, in which case z is customarily 2. X is preferably a methoxy or ethoxy group. The group Y may be bonded terminally to the alkyl radical R. It is also possible for two or more groups Y to be bonded to one alkyl radical.

Following a condensation reaction of the Si(X) moiety with superficial OH groups of the metal pigment surface, the silanes bind to this surface. The reactive function Y, conversely, may bring about attachment to the powder coating binder that is subsequently precipitated on. This attachment may involve covalent bonds or else less strong interactions such as hydrogen bonds. The critical factor is that by means of the silanes functioning as adhesion promoters, the powder coating binder is anchored on the metal pigment surface with a strength such it remains largely bonded on the effect pigment in the course of subsequent further processing of the effect pigment, by sieving, for example, or of further processing to a powder coating. Accordingly, the silanes act as adhesion promoters between the metal pigment surface and the powder coating binder of the coating.

Preferred functional groups Y are isocyanate, epoxy, amino, hydroxy, carboxy, acrylate or methacrylate groups. These groups react with corresponding, chemically compatible counter-groups of the powder coating binder. Here, however, the binder as such does not cure; in other words, the oligomeric/polymeric binder retains its chemical cross-linkability or curability. The functional group Y of the silane may react, for example, with functional groups of the powder coating binder that are not involved or are only partially involved in the curing of the powder coating binder. For example, the functional group of the powder coating binder, based on the functional group Y of the silane, may be present in a stoichiometric excess. On the metal pigment surface precoated with at least one silane compound of formula (III), the functional groups (Y) are generally in a stoichiometric deficit, based on the corresponding, chemically compatible, functional counter-group of the subsequently applied powder coating binder.

For example, Y may be an isocyanate group or an epoxy group, while the binder comprises polyester components having polyol and polycarboxy functions. Where appropriate with addition of a catalyst, the isocyanate groups are able to react even at room temperature with OH groups of the binder. The polyester coating then cures, during the baking of the coating system, only after the metal pigment has been coated and incorporated into a coating system.

The group Y is preferably a terminal group, since in that case the reactivity is greatest, owing to the least steric hindrance. Alternatively, it may be a largely terminal group, in which there may additionally be up to 3 C atoms to the chain end before the Y function.

The binder functionalities which react with Y may also be the same as those which construct the polymer on the curing of the binder. This is possible because—as already observed above—the Y-reactive functional groups of the powder coating binder are generally present in a stoichiometric excess to the functional group Y on the pigment surface, and so, after the reactive group Y has reacted with the oligomeric/polymeric binder, there are still sufficient functional groups on the oligomeric and/or polymeric binder for the crosslinking or curing. The functional group of the powder coating binder that is reactive with the reactive group Y may also be different from the functional group or functional groups which are involved in the curing of the binder.

Organofunctional silanes suitable as surface modifiers, with corresponding functional groups, are available commercially. There are, for example, many representatives of the products produced by Evonik, Rheinfelden, and sold under the tradename "Dynasylan®", or of the Silquest® silanes produced by OSi Specialties, or of the GENOSIL® silanes produced by Wacker.

Examples thereof are 3-methacryloyloxypropyltrimethoxysilane (Dynasylan MEMO, Silquest A-174NT), 3-mercaptopropyltri(m)ethoxysilane (Dynasylan MTMO or 3201; Silquest A-189), 3-glycidyloxypropyltrimethoxysilane (Dynasylan GLYMO, Silquest A-187), tris(3-trimethoxysilylpropyl) isocyanurate (Silquest Y-11597), gamma-mercaptopropyltrimethoxysilane (Silquest A-189), beta(3,4-epoxycyclohexyl)ethyltrimethoxysilane (Silquest A-186), gamma-isocyanatopropyltrimethoxysilane (Silquest A-Link 35, Genosil GF40), (methacryloyloxymethyl) trimethoxysilane (Genosil XL 33), (isocyanatomethyl) trimethoxysilane (Genosil XL 43), aminopropyltrimethoxysilane (Dynasylan AMMO; Silquest A-1110), aminopropyltriethoxysilane (Dynasylan AMEO) or N-(2-aminoethyl)-3-aminopropyltrimethoxysilane (Dynasylan DAMO, Silquest A-1120) or N-(2-aminoethyl)-3-aminopropyltriethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3, 3-dimethylbutyltrimethoxysilane (Silquest Y-11637), (N-cyclohexylaminomethyl)triethoxysilane (Genosil XL 926), (N-phenylaminomethyl)trimethoxysilane (Genosil XL 973), and mixtures thereof.

The silanes, preferably silanes of formula (I), may be applied directly on the metallic surface of effect pigments. According to one preferred development, the effect pigments are metal pigments which are provided with an $SiO_2$ coating, preferably enveloped with an $SiO_2$ coating, the silanes being applied on the $SiO_2$ coating. The powder coating binder is then applied to the metal pigments thus precoated.

IV Method:

A method for producing an inventively coated effect pigment comprises the following steps:

a1) dissolving a binder which is spontaneously precipitatable in an organic solvent or solvent mixture within a first time span of $t_{sol}$ at a temperature $T_{sol}$ from a range from 0° C. to 80° C., b1) subsequently adding an effect pigment to the solvent or solvent mixture from a1), with dispersion of the effect pigment, c1) coating the effect pigment with the binder within a second timespan $t_{insol}$ at a temperature $T_{insol}$ from a range from 0° C. to 80° C., a2) dispersing an effect pigment in a solvent or solvent mixture, b2) subsequently adding a binder which is spontaneously precipitable to the solvent or solvent mixture which has a temperature $T_{sol}$, c2) coating the effect pigment with a binder within a timespan $t_{insol}$, d) removing the coated effect pigment from the solvent or solvent mixture, and e) optionally drying out the coated effect pigment.

Accordingly, there are two main methods for producing the inventively coated effect pigments. In the first method, the binder which is spontaneously precipitable is first dissolved in an organic solvent or solvent mixture. In and of itself, the timespan $t_{sol}$ is not important and will be determined by practical considerations. Preferably the timespan $t_{sol}$ lies in a range from around 0.25 to 3 h. Dissolution is facilitated advantageously by stirring and/or ultrasound treatment of this solution.

The concentration of the binder here is in a range from around 10 to 40 wt %, preferably 15 to 25 wt %, based on the amount of solvent. To save solvent it is possible to operate at relatively high concentration, though bearing in mind that the effect pigment can still be effectively dispersed.

The second step b1), the step of adding the effect pigment to the solvent and of dispersing the effect pigment in the solution, ought advantageously to take place as soon as the dissolution of the binder is concluded. If too long a time elapses here, spontaneous precipitation of the binder may commence at this early stage.

Before being added to the dissolved polymer, the effect pigment may already take the form of a separate dispersion in a solvent, preferably in the solvent or solvent mixture which is already being used for step a1). In this way the addition can be made easier, by metered addition with apparatus customary for the purpose, for example. In this way it is possible, too, to prevent dusting, which is possible in the case of an effect pigment powder, and the addition takes place with virtually no residue.

The second method is even simpler and is preferred in accordance with the invention. Here, the effect pigment as per step a2) is already in dispersion in the solvent or solvent mixture.

It has emerged that in step a2), the dissolution of the added polymer in the solvent or solvent mixture is largely not influenced by the already dispersed effect pigment. Precipitation onto the effect pigment in step c2) is virtually seamless. Steps b2) and c2) may also overlap in terms of time. This is not necessarily a disadvantage, since polymer which has not yet dissolved largely does not impair the precipitation of the already dissolved polymer.

The timespan $t_{insol}$ in step c1) or c2) is in a range from 0.5 h to 12 h and more preferably from a range from 1 h to 10 h and also, with very particular preference, from a range from 2 h to 8 h. Also possible are timespans from 0.5 h to 1.5 h. Precipitation of the polymer is largely quantitative, preferably 92% to 100%. It has emerged, however, that not always all the polymer coats the effect pigments; a certain fraction may also be present in the form of secondary precipitates. Particularly in powder coating applications, however, this is not a disadvantage.

The effect pigments are, however, coated very homogeneously, and largely quantitatively in their area, by the binder.

The binder precipitation temperature $T_{insol}$ in steps c1) or c2) is preferably in a range from 0° C. to 80° C., more preferably in a range from 10° C. up to 5° C. below the boiling point of the solvent or solvent mixture, with further preference in a range from 15° C. to 50° C., and very preferably in a range from 18° C. to 30° C. Precipitation takes place more rapidly at lower temperatures than at higher temperatures. The temperature is advantageously at or close to room temperature. This saves energy expense associated with operations of heating or cooling the dispersion.

The temperature $T_{sol}$ for step a1) or b2) is also preferably in a range from 0° C. to 80° C., more preferably in a range from 10° C. up to 5° C. below the boiling point of the solvent or solvent mixture, with further preference in a range from 15° C. to 50° C., and very preferably in a range from 18° C. to 30° C. Here again it is the case that operating at or close to room temperature affords the most advantages.

In particularly preferred methods of the invention, the difference $\Delta T=T_{insol}-T_{sol}$ for both methods is in a range from 0 to 5° C. and therefore there is spontaneous precipitation. Here, of course, the method is particularly easy to control, since to a large extent it is possible to do without heating or cooling steps.

For $T_{sol}$ or $T_{insol}$, however, it is also possible to select different temperatures. Thus, for example, the binder in the first method may be dissolved at a higher temperature, which usually takes place more quickly than at lower temperatures, after which precipitation can take place at a lower temperature.

Variants of the methods with different temperatures for $T_{sol}$ or $T_{insol}$, however, do not represent a method according to LCST or UCST polymers, since the invention prefers not to use LCST or UCST polymers as binders.

Preferably, $t_{insol}$ in step c1) or c2) is in a range from 0.5 h to 12 h and more preferably in a range from 2 to 8 h.

Moreover, it is also possible to select precipitation times $t_{insol}$ from a range from 1 h to 2 h.

If $t_{insol}$ is below 0.5 h, the precipitation may be uncontrolled, with too high a fraction of secondary precipitations, i.e., binder not precipitated onto the surface of the effect pigment.

If $t_{insol}$ is above 12 h, then no disadvantages are anticipated on the product side, but the inherently extremely simple method becomes unnecessary long.

A solvent is advantageously selected for which the precipitation times $t_{insol}$ are short, in the region of around 1 h to 3 h, and the temperatures $T_{insol}$ are at or close to room temperature, preferably 18° C. to 30° C.

The effect pigment to be coated may be present in the form of a paste or a powder. Metallic effect pigments, as a result of their production, are frequently in the form of a paste containing white spirit and having a solids fraction of around 50 to 70 wt %. In this case, a further solvent is introduced into the system that is relatively apolar. This need not adversely affect the precipitation process, but preliminary experiments with corresponding solvent mixtures ought to be used to ascertain whether the binder used can be precipitated in these systems.

The effect pigment is preferably in the form of a powder. Here, on the one hand, the conditions for the precipitation of the polymer are better defined, but on the other hand, with regard to the possibility of solvent workup, it is an advantage if a solvent mixture is not present.

For both methods, preferably the organic solvent is selected from the group consisting of acetone, methyl ethyl ketone, ethyl acetate, and also mixtures thereof.

Here, advantageously, rather than a mixture, a decision will be made in favor of one of the solvents.

Where the effect pigment is a metallic effect pigment present initially in the form of a paste containing white spirit, the solvents identified as preferred above will be present in a mixture with white spirit. In that case, it ought to be ensured that the white spirit or another apolar solvent present in the metallic effect pigment paste is present in the dispersion at concentrations of preferably below 20 wt %, more preferably below 10 wt %, based on the overall solvent.

Steps d) and optionally e) of the methods are known standard steps and can be carried out in the customary way.

All in all, the methods of the invention are notable for their great simplicity and low costs.

The solvent used can be circulated; in other words, solvent separated off after step d) can be returned, optionally after simple workup, back to the coating process.

The binders used in the method of the invention are spontaneously precipitable in the sense of this invention. In preferred embodiments, the binder has polyester functions. In particularly preferred embodiments the binder is a polyester which can be used as a powder coating binder. Binders of this kind are prepared via melt polymerization. In such a case, the monomers (monomers containing carboxylic acid functions, as acid component, and monomers containing alcohol functions, as alcohol component) are brought to the melt state and oligerimized or polymerized by polycondensation in the presence of suitable catalysts. Polyesters are formed which may have hydroxyl groups or carboxylic acid groups as terminal functional groups. These polyesters are of course not fully cured, since, indeed, they are required to cure further as binders in the powder coating after the coating operation, when the coating is baked.

In further preferred embodiments, the polyester comprises as acid component a main part of monomers of the group consisting of isophthalic acid and terephthalic acid and mixtures thereof. In particularly preferred embodiments, the binder comprises as acid component at least 14 mol % of isophthalic acid, based on all the acid components.

The fraction of isophthalic acid and terephthalic acid is preferably 50 to 100 mol % and more preferably 70 to 96 mol %, based on all the acid components.

Further acid components, preferably not included as the main part, there may be adipic acid, phthalic acid, succinic acid, glutaric acid, pimelic acid, azelaic acid, sebacic acid, fumaric acid, maleic acid, 1,3-cyclohexanedicarboxylic acid, 1,4-cyclohexanedicarboxylic acid, and mixtures of these compounds present. Also present in small amounts (below 10 mol %) as branching units may be carboxylic acids with a functionality of three or more, such as trimellitic acid or pyromellitic acid.

With regard to the alcohol components of the polyester binder, preferred embodiments are those featuring as alcohol component a main fraction of neopentyl glycol and/or 2-butyl-2-ethyl-1,3-propanediol. The fraction of neopentyl glycol and/or 2-butyl-2-ethyl-1,3-propanediol is preferably 50 to 100 mol %, more preferably 70 to 98 mol %, and very preferably 80 to 95 mol %, based on all the alcohol components. With very particular preference here neopentyl glycol is the main alcohol component.

Polyester binders with alcohol contents of this kind tend to be assigned in the literature to the "amorphous" polyesters (U.S. Pat. No. 6,660,398 B1, U.S. Pat. No. 6,635,721 B1).

As further alcohol components, preferably at total less than 50 mol % of all the alcohol components, there may be, for example, ethylene glycol, 1,3-propylene glycol, 1,4-butanediol, 1,6-hexanediol, 2-methy-1,3-propanediol, 1,4-cyclohexanedimethanol, hydrogenated bisphenol A, neopentyl glycol hydroxypivalate, and mixtures of these compounds present.

Also present in small amounts (below 10 mol %) as branching units may be hydroxylated compounds having a functionality of three or more, containing at least three hydroxyl groups, such as, for example, trimethylolpropane, ditrimethylolpropane, pentaerythritol, and mixtures thereof.

In further-improved embodiments, with regard to the alcohol components of the polyester, the molar ratio of linear α,ω-alcohols such as, for example, ethylene glycol to neopentyl glycol and/or 2-butyl-2-ethyl-1,3-propanediol is below 20%, more preferably below 15%, even more preferably below 12%, and very preferably below 10%. Polyesters having too high a level of linear α,ω-alcohols such as ethylene glycol, for example, have proven to be less suitable for the spontaneous precipitation.

In further embodiments, the precipitation of the powder coating binders, particularly of the polyester powder coating binders, may take place, entirely surprisingly, in the presence of additives which function as precipitation control agents. The effect of these additives is that of more efficient precipitation of the powder coating binders on the effect pigment surface. This is manifested in a higher occupancy of the pigments with binder and in correspondingly reduced secondary precipitation.

These additives are preferably comb copolymers based on maleic anhydrides with vinylaromatics, preferably with substituted or unsubstituted styrene. Further, these additives preferably possess polyether units (EO and/or PO) which are connected to acid groups via ester, amide or imide groups.

These additives preferably have acid numbers of 4 to 45 mg KOH/g, more preferably of 5 to 40 mg KOH/g.

With further preference they are salts, in which the acid number is approximately equal to the amine number.

Additives of these kinds are described for example in EP 2125909 B1, EP 2106412 B1, EP 2125910 B1, EP 2240543 B1, DE 102010049642 A1, EP 2723779 B1 or EP 2864373 B1.

Examples of commercially available additives are Byk 190, Disperbyk 2060, Disperbyk 2010, Byk ES80 or Byk 187 (all from Byk Additives & Instruments, Abelstrasse 26, D-46483 Wesel, Germany).

Additives of these kinds customarily find use predominantly as wetting and dispersing agents, particularly in regard to the formation of pigment pastes. Their function as auxiliaires in the spontaneous precipitation of polymer onto effect pigments as described in this invention was not foreseeable.

In another embodiment of the present invention, the effect pigment, after step a2) and before the addition of the binder, and optionally before the addition of an additive, is treated with an adhesion promoter. The adhesion promoters, particularly functional silanes, were described earlier on above.

A further subject of the invention is the use of the effect pigments of the invention.

The effect pigments coated in accordance with the invention find use in paints, powder coatings, printing inks, toners or plastics. Particularly preferred is their use in powder coatings.

Since the binders used in accordance with the invention are binders suitable as powder coating binders, the effect pigments of the invention can be processed to particularly good effect in powder coating. Here, the binder of the powder coating in which the effect pigment is incorporated may be the same as or different from the binder of which the coating is composed. In preferred embodiments, polyester resins will be selected both as coating binder for the effect pigments and as binder for the powder coating.

LIST OF THE FIGURES

FIG. 1: DSC diagrams recorded at 5° K/min in a temperature range from 30 to 210° C. in a representation against the temperature. The diagram shows only the lines toward higher temperatures, and no backward lines.

Figure 2A:
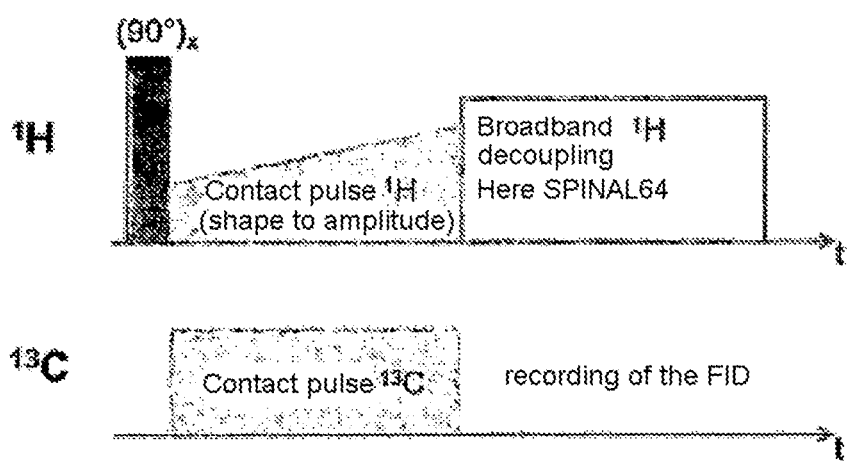
Figure 2B:
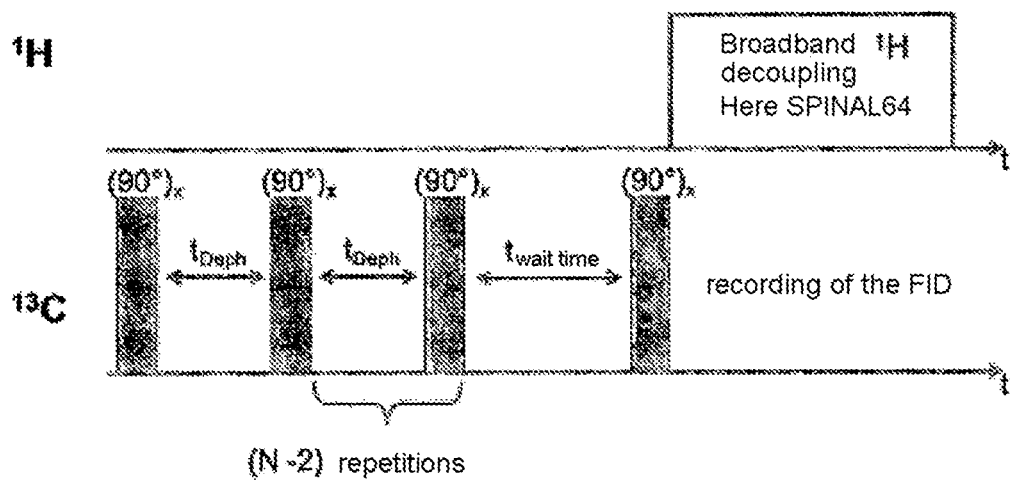

_____ (Continuous line): preliminary test example 1: powder coating CC 4540-0 after precipitation from acetone, _•_•_• (dash, dot line): preliminary test comparative example 1: powder coating CC 4540-0 as obtained from the manufacturer _••_••_• (dash, dot, dot line): preliminary test example 1b: powder coating CC 4540-0 after precipitation, $2^{nd}$ scan directly after $1^{st}$ scan FIG. 2: schematic representation of the pulse sequences used for the $^{13}$C MAS NMR overview measurements (FIG. 2a) and for the $^{13}$C NMR MAS relaxation measurements (FIG. 2b).

Figure 3:
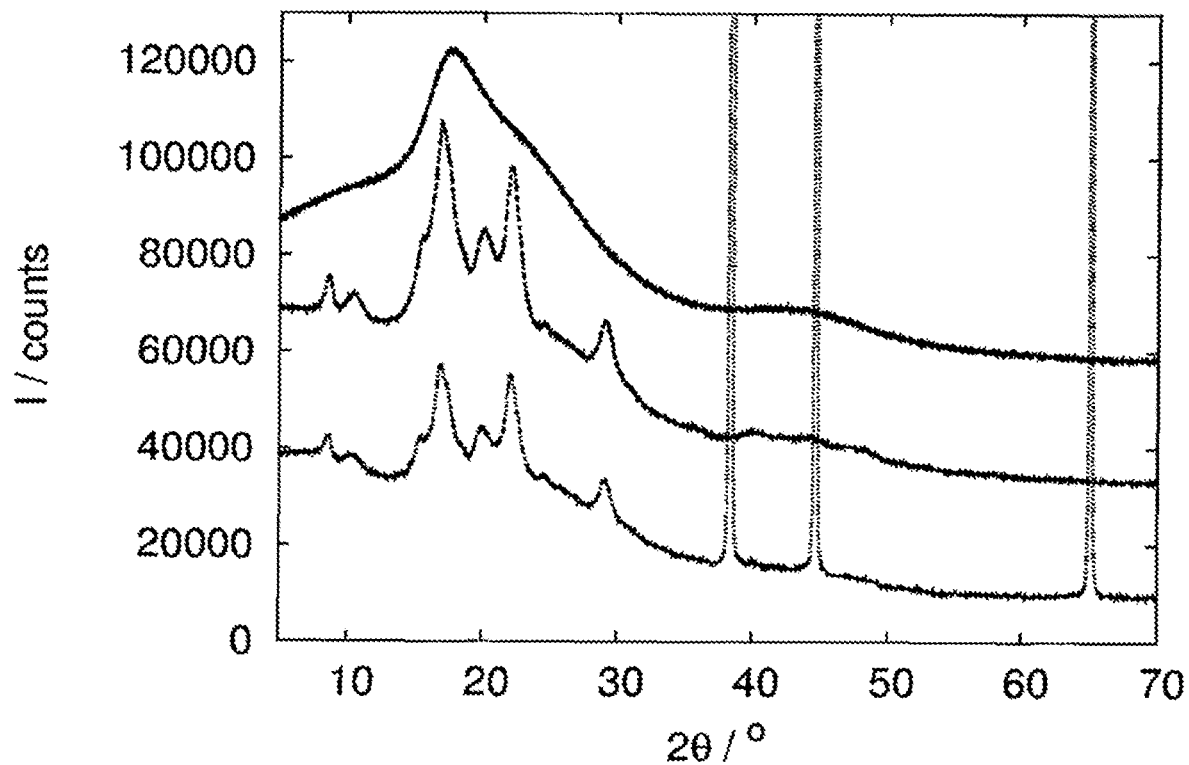

FIG. 3: PXRD of preliminary test example 1 (CC 4540-0) for the amorphous phase as per preliminary test comparative example 1 (top) and semicrystalline phase as per preliminary test example 1 (middle, dashed line) and also for the coated aluminum particles of example 1 (bottom, dotted line).

The measurement was made on a STOE StadiP diffractometer in Debye-Scherrer geometry with $Cu_{K\alpha 1}$ radiation (Ge(111) monochromator). $SiO_2$ capillaries with a diameter of 0.3 mm were used. For better overview, the measurement data for the amorphous samples and for the semicrystalline samples were shifted upward by 50 000 and 25 000 counts. The very sharp and high peaks for example 1 are attributable to reflections of the aluminum substrate.

Figure 4:
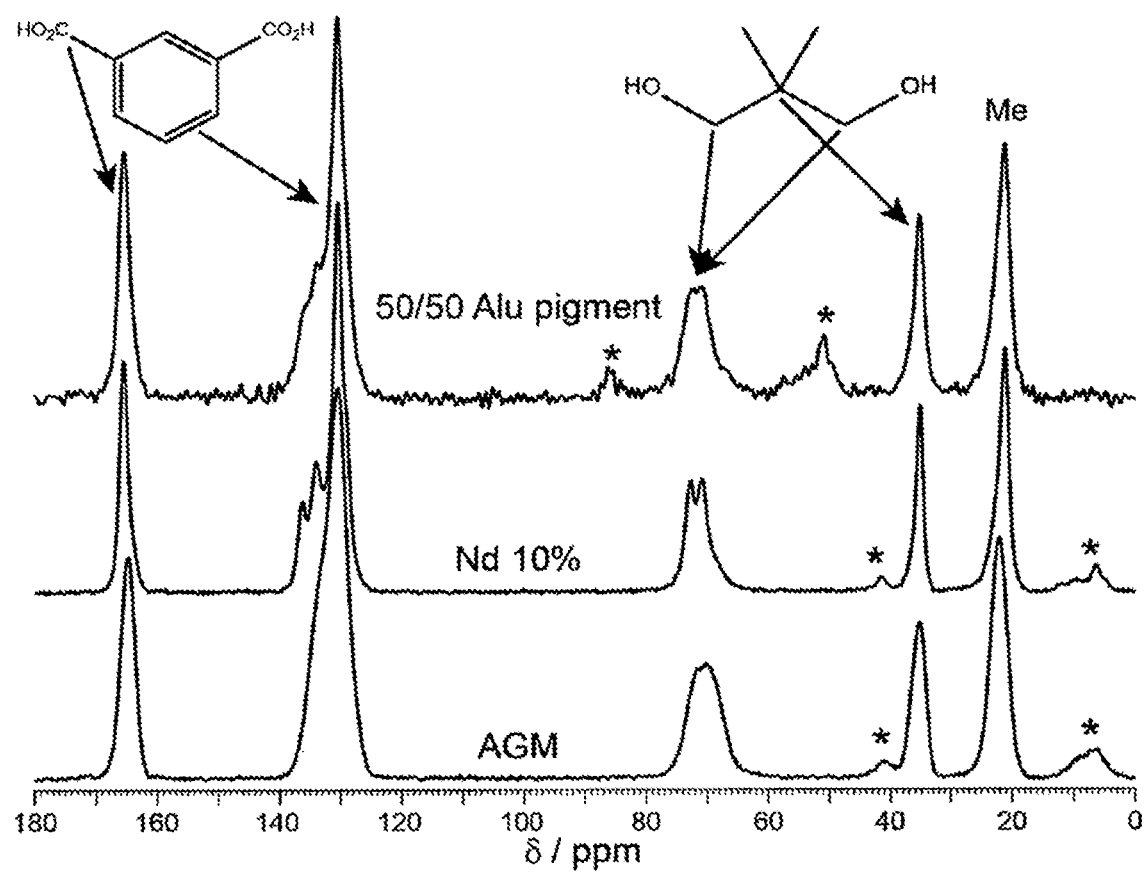

FIG. 4: $^{13}$C CP MAS spectra of the binder CC 4540-0 for the amorphous phase as per preliminary test comparative example 1 (bottom, labeled "AGM"; $\nu_{rot}$=12.5 kHz), for the semicrystalline phase as per preliminary test example 1 (middle, labeled "ND 10%"; vrot=12.5 kHz), and for the coated aluminum particles as per example 1 (top, labeled "50/50" Alu pigment"; $\nu_{rot}$=8 kHz). Rotational sidebands are marked with an asterisk and the isotropic chemical shifts were assigned to the characteristic chemical structural units of the acid and alcohol components of the polyester.

Figure 5:
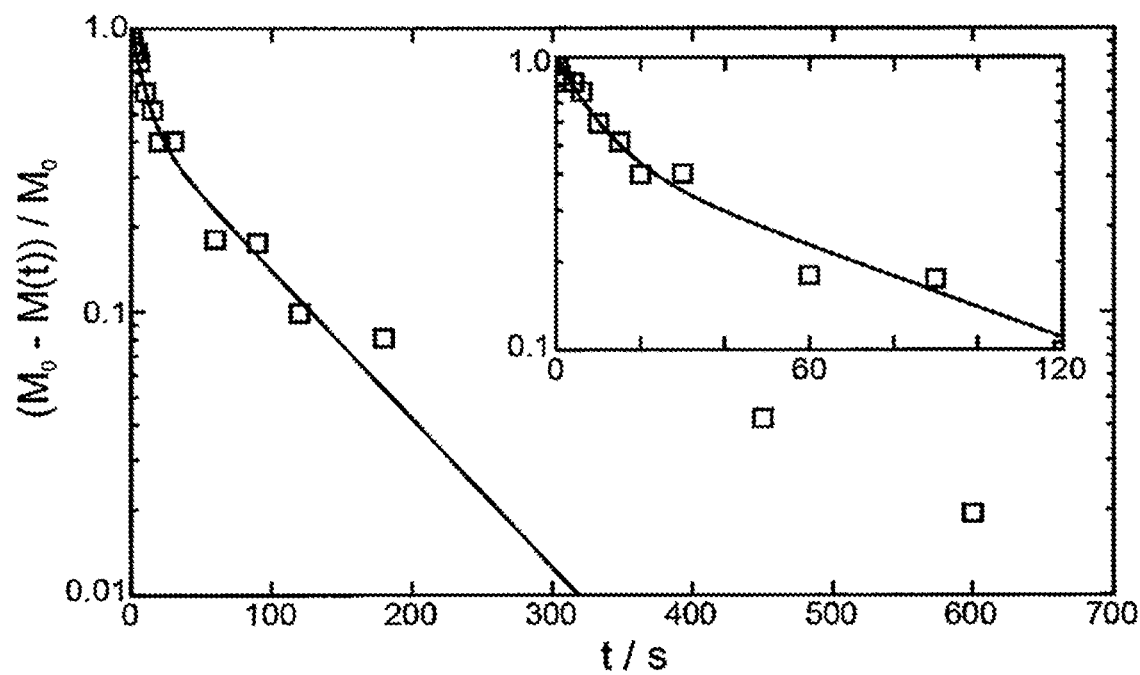

FIG. 5: plot of the extent of relaxation against the waiting time for the $^{13}$C resonance of the methylene group of the semicrystalline polymer from preliminary test example 1 (binder CC 4540-0). The two different time constants for the amorphous fraction and the crystalline fraction are reflected in two regions having significantly different slopes.

Figure 6:
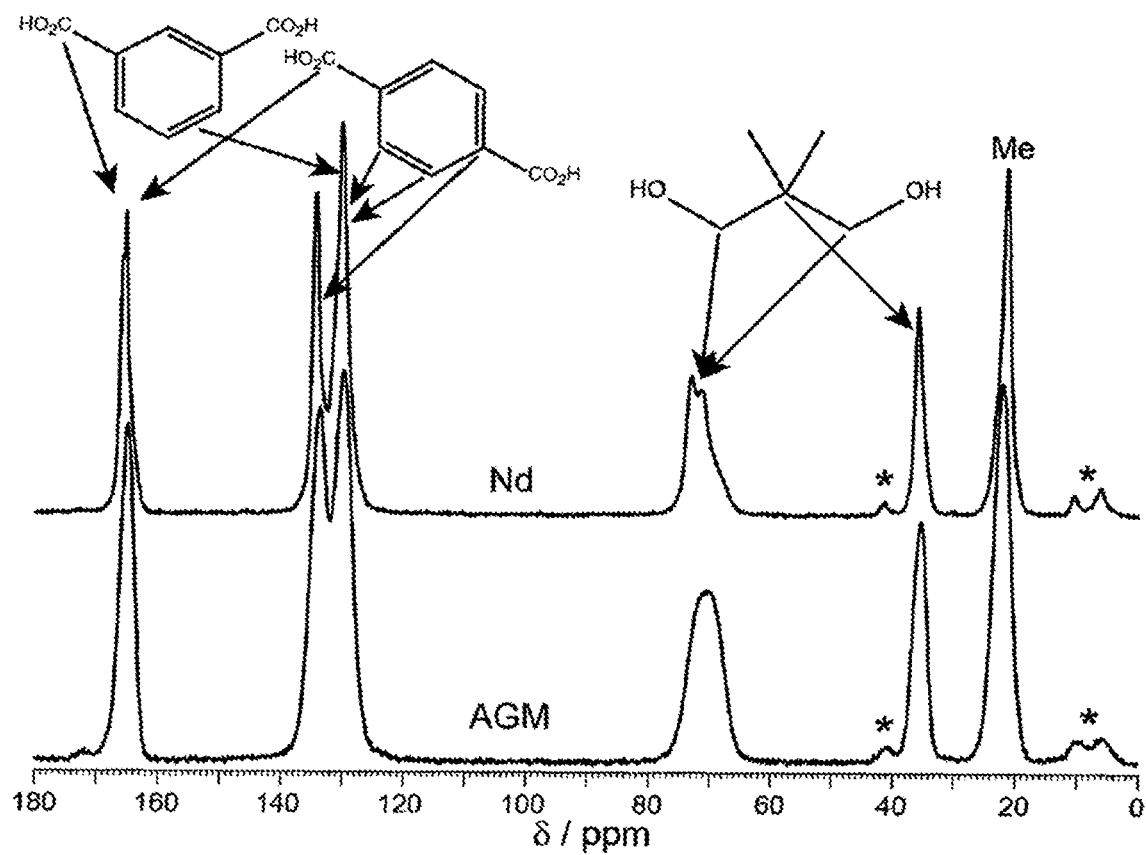

FIG. 6: $^{13}$C CP MAS spectra of the binder CC 2506 for the amorphous phase as per preliminary test comparative example 10 (bottom, labeled "AGM"; $\nu_{rot}$=6 kHz) and for the semicrystalline phase as per preliminary test example 1 (middle, labeled "ND"; $\nu_{rot}$=6 kHz). Rotational sidebands are marked with an asterisk and the isotropic chemical shifts were assigned to the characteristic chemical structural units.

Figure 7:
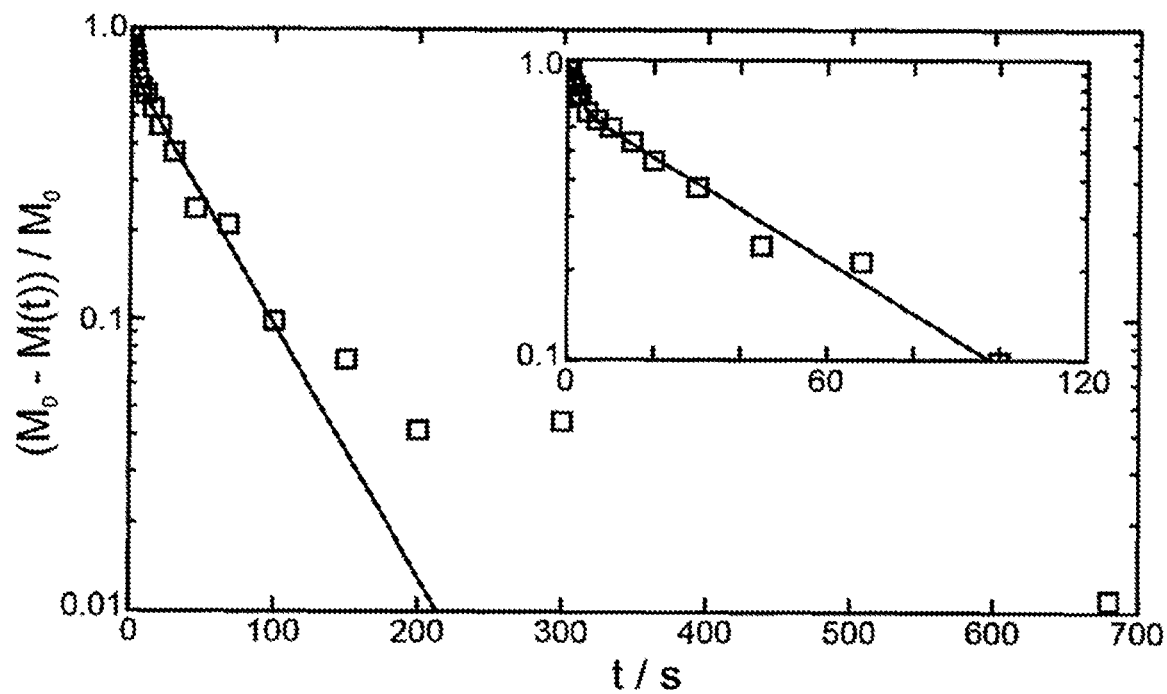

FIG. 7: plot of the extent of relaxation against the waiting time for the $^{13}$C resonance of the methylene group of the semicrystalline polymer from preliminary test example 10 (binder CC 2506-1). The two different time constants for the amorphous fraction and the crystalline fraction are reflected in two regions having significantly different slopes.

ASPECTS

The invention further relates to subject matter comprising coated effect pigments according to one of the claims or aspects.

According to an aspect 1, the present invention relates to a coated effect pigment comprising a platelet-shaped substrate and a coating applied thereon and comprising a binder for powder coating material;
characterized,
in that the binder has a crystalline and an amorphous fraction which is determined by means of $^{13}$C NMR MAS relaxation measurements, the relaxation of the $^{13}$C nuclei being fitted as a biexponential relaxation according to the formula $$M(t, M_0, a, c, T_1^s, T_1^l) = M_0 \cdot \left[(1-c) \cdot \left(1 - a \cdot e^{-\left(\frac{t}{T_1^s}\right)}\right) + c \cdot \left(1 - a \cdot e^{-\left(\frac{t}{T_1^l}\right)}\right)\right]$$

where the degree of crystallinity c is in a range between 40% to 85% and where there are a short average relaxation time $T_1^s$ and a long average relaxation time $T_1^l$ and where $T_1^l$ is in a range from 65 to 130 s.

According to an aspect 2 of the present invention, the coated effect pigment according to aspect 1 preferably comprises a binder having a degree of crystallinity c of 45% to 75%.

According to an aspect 3 of the present invention, in the coated effect pigment according to any of aspects 1 and 2, the long average relaxation time $T_1^l$ is preferably in a range from 70 to 110 s.

According to an aspect 4 of the present invention, in the coated effect pigment of aspects 1 to 3, the binder is preferably not an LCST or UCST polymer.

According to an aspect 5 of the present invention, in the coated effect pigment according to any of the preceding aspects, the binder in the PXRD diffractogram in Debye-Scherrer geometry (capillary 0.3 mm diameter) preferably has structured peaks with full widths at half maximum in the range from 0.7 to 2.0° (in 2θ), using Cu Kα1 as x-ray source and using germanium(111) with a slit width of 0.5 mm as monochromator.

According to an aspect 6 of the present invention, in the coated effect pigment according to the preceding aspects, in a DSC diagram at a rate of advance of 5° C./min, preferably has at least one endothermic peak having a maximum from a range of $T_{max}$=100 to 150° C. and also having an enthalpy ΔH associated with this peak from a range from 15 J/g to 80 J/g, the enthalpy being calculated on the amount of the binder.

According to an aspect 7 of the present invention, the coated effect pigment according to the preceding aspects is produced preferably by the method according to aspects 19 to 33.

According to an aspect 8 of the present invention, in the coated effect pigment according to any of the preceding aspects, the binder preferably has polyester functions and is prepared via a melt polymerization.

According to an aspect 9 of the present invention, in the coated effect pigment according to aspect 8, the binder is preferably a polyester containing acid and alcohol components and as acid components a main fraction is taken from monomers of the group consisting of isophthalic acid and terephthalic acid and mixtures thereof.

According to an aspect 10 of the present invention, in the coated effect pigment according to aspect 8 or 9, the binder comprises preferably as acid component at least 14 mol % of isophthalic acid, based on all the acid components.

According to an aspect 11 of the present invention, in the coated effect pigment according to any of aspects 8 to 10, the binder comprises preferably as alcohol component a fraction of neopentyl glycol and/or 2-butyl-2-ethyl-1,3-propanediol of 50 to 100 mol %, based on all the alcohol components.

According to an aspect 12 of the present invention, in the coated effect pigment according to aspect 11, with regard to the alcohol components of the polyester, the polyester preferably has a molar ratio of ethylene glycol and/or diethylene glycol to neopentyl glycol and/or 2-butyl-2-ethyl-1,3-propanediol of less than 20%.

According to an aspect 13 of the present invention, in the coated effect pigment according to any of aspects 6 to 12, the binder preferably has a ratio of the endothermic enthalpies of fusion ΔH/ΔH$_{AGM}$, which can be determined by means of the run of a DSC measurement at a rate of advance of 5° C./min and which are based on the amount of binder, after the precipitation (ΔH) in relation to the binder before the precipitation (ΔH$_{AGM}$), in a range from 2 to 10.

According to an aspect 14 of the present invention, in the coated effect pigment according to any of aspects 6 to 13, the binder preferably exhibits an increase of ΔT$_{Max}$ in the DSC from the crystallized state in comparison to the uncrystallized state from a range from 40 to 75° C.

According to an aspect 15 of the present invention, in the coated effect pigment according to any of the preceding aspects, the platelet-shaped substrate is preferably taken from the group consisting of metallic effect pigments, pearlescent pigments, and interference pigments, and also mixtures thereof.

According to an aspect 16 of the present invention, in the coated effect pigment according to any of the preceding aspects, the platelet-shaped substrate is preferably a pearlescent pigment or is a metallic effect pigment coated with a metal oxide.

According to an aspect 17 of the present invention, in the coated effect pigment according to aspect 16, the metal oxide is preferably taken from the group consisting of silicon (di)oxide, silicon oxide hydrate, silicon hydroxide, aluminum oxide, aluminum oxide hydrate, aluminum hydroxide, and mixtures thereof.

According to an aspect 18 of the present invention, in the coated effect pigment according to either of aspects 16 and 17, the platelet-shaped substrate is preferably an $SiO_2$-coated aluminum effect pigment.

According to an aspect 19, the present invention relates to a method for producing coated effect pigments comprising a platelet-shaped substrate and a coating applied thereon for powder coating material, comprising the following steps:

a1) dissolving a binder which is spontaneously precipitatable in an organic solvent or solvent mixture within a first time span of $t_{sol}$ at a temperature $T_{sol}$, b1) subsequently adding an effect pigment to the solvent or solvent mixture from a1), with dispersion of the effect pigment, c1) coating the effect pigment with the binder within a second timespan $t_{insol}$ at a temperature $T_{insol}$ or a2) dispersing an effect pigment in a solvent or solvent mixture, b2) subsequently adding a binder which is spontaneously precipitable to the solvent or solvent mixture which has a temperature $T_{sol}$, c2) coating the effect pigment with the binder within a timespan $t_{insol}$ at a temperature $T_{insol}$, d) removing the coated effect pigment from the solvent or solvent mixture, and e) optionally drying out the coated effect pigment.

According to an aspect 20 of the present invention, in the method according to aspect 22 the method is preferably characterized in that the difference $\Delta T = T_{insol} - T_{sol}$ is in a range from 0 to 5° C. and there is spontaneous precipitation.

According to an aspect 21 of the present invention, in the method according to aspect 19 or 20, the method is preferably characterized in that the temperature $T_{insol}$ for step c1) or c2) is in a range from 10° C. to 5° C. below the boiling temperature of the solvent or solvent mixture.

According to an aspect 22 of the present invention, in the method according to aspect 21, the method is preferably characterized in that the temperature $T_{insol}$ for step c1) or c2) is in a range from 18° C. to 30° C.

According to an aspect 23 of the present invention, in the method according to aspect 219 to 22, the method is preferably characterized in that the temperature $T_{sol}$ for step a1) or b2) is in a range from 10° C. to 5° C. below the boiling temperature of the solvent or solvent mixture.

According to an aspect 24 of the present invention, in the method according to aspect 23, the method is preferably characterized in that the temperature $T_{sol}$ for step a1) or b2) is in a range from 18° C. to 30° C.

According to an aspect 25 of the present invention, in the method according to any aspects 19 to 24, the method is preferably characterized in that $t_{insol}$ in step c1) or c2) is in a range from 0.5 h to 12 h.

According to an aspect 26 of the present invention, in the method according to any of aspects 19 to 25, the method is preferably characterized in that the organic solvent is selected from the group consisting of acetone, methyl ethyl ketone, ethyl acetate, and also mixtures thereof.

According to an aspect 27 of the present invention, in the method according to any of aspects 19 to 26, the method is preferably characterized in that the binder is not an LCST or UCST polymer.

According to an aspect 28 of the present invention, in the method according to any of aspects 19 to 27, the method is preferably characterized in that the binder has polyester functions and is prepared via a melt polymerization.

According to an aspect 29 of the present invention, in the method according to aspect 28, the method is preferably characterized in that the binder is a polyester containing acid and alcohol components and as acid components a main fraction is taken from monomers of the group consisting of isophthalic acid and terephthalic acid and mixtures thereof.

According to an aspect 30 of the present invention, in the method according to aspect 28 or 29, the method is preferably characterized in that the binder comprises as acid component at least 14 mol % of isophthalic acid, based on all the acid components.

According to an aspect 31 of the present invention, in the method for producing a coated effect pigment according to any of aspects 28 to 30, the method is preferably characterized in that the binder comprises as alcohol component a fraction of neopentyl glycol and/or 2-butyl-2-ethyl-1,3-propanediol of 50 to 100 mol %, based on all the alcohol components.

According to an aspect 32 of the present invention, in the method for producing a coated effect pigment according to aspect 31, the method is preferably characterized in that with regard to the alcohol components of the polyester it has a molar ratio of ethylene glycol and/or diethylene glycol to neopentyl glycol and/or 2-butyl-2-ethyl-1,3-propanediol of less than 20%.

According to a further aspect 33 of the present invention, in accordance with any of aspects 19 to 32, after step a2) an additive is added as precipitation assistant, the additive preferably being a comb polymer based on maleic anhydride and a vinyl-containing aromatic, preferably styrene.

According to a further aspect 33 of the present invention, in accordance with any of aspects 19 to 33, the effect pigment after step a2) and before the addition of binder, and optionally the addition of additive, is treated with an adhesion promoter.

According to an aspect 34 of the present invention, the coated effect pigments according to aspect 1 to 18 are used in paints, powder coatings, printing inks, toners or plastics.

According to a further aspect 35, the present invention relates to a coated effect pigment comprising a platelet-shaped substrate and a coating applied thereon and comprising a binder for powder coating material;
characterized
in that in a DSC diagram at a rate of advance of 5° C./min, preferably has at least one endothermic peak having a maximum from a range of $T_{max}=100$ to 150° C. and also having an enthalpy $\Delta H$ associated with this peak from a range from 15 J/g to 80 J/g, the enthalpy being calculated on the amount of the binder.

According to an aspect 36 of the present invention, in the coated effect pigment according to aspect 35, the binder preferably has a ratio of the endothermic enthalpies of fusion $\Delta H/\Delta H_{AGM}$, which can be determined by means of the run of a DSC measurement at a rate of advance of 5° C./min and which are based on the amount of binder, after the precipitation ($\Delta H$) in relation to the binder before the precipitation ($\Delta H_{AGM}$), in a range from 2 to 10.

According to an aspect 37 of the present invention, in the coated effect pigment according to any of aspect 35 or 36, the binder preferably exhibits an increase of $\Delta T_{Max}$ in the DSC from the crystallized state in comparison to uncrystallized state from a range from 40 to 75° C.

According to an aspect 38 of the present invention, in the coated effect pigment of aspects 35 to 37, the binder is preferably not an LCST or UCST polymer.

According to an aspect 39 of the present invention, in the coated effect pigment according to either of the preceding aspects 37 to 38, the binder in the PXRD diffractogram in Debye-Scherrer geometry (capillary 0.3 mm diameter) preferably has structured peaks with full widths at half maximum in the range from 0.7 to 2.0° (in 2θ), using Cu Kα1 as x-ray source and using germanium(111) with a slit width of 0.5 mm as monochromator.

According to an aspect 40 of the present invention, in the coated effect pigment according to preceding aspects 35 to 39, the binder preferably has a crystalline and amorphous fraction which is determined by means of $^{13}C$ NMR MAS relaxation measurements, the relaxation of the $^{13}C$ nuclei being fitted as a biexponential relaxation according to the formula $$M(t, M_0, a, c, T_1^s, T_1^l) = M_0 \cdot \left[(1-c) \cdot \left(1 - a \cdot e^{-\left(\frac{t}{T_1^s}\right)}\right) + c \cdot \left(1 - a \cdot e^{-\left(\frac{t}{T_1^l}\right)}\right)\right]$$

where the degree of crystallinity c is in a range between 40% to 85% and where there are a short average relaxation time $T_1^s$ and a long average relaxation time $T_1^l$ and where $T_1^l$ is in a range from 65 to 130 s.

According to an aspect 41 of the present invention, the coated effect pigment according to aspect 40 preferably comprises a binder having a degree of crystallinity c of 45% to 75%.

According to an aspect 42 of the present invention, in the coated effect pigment according to any of aspects 40 and 41, the long average relaxation time $T_1^l$ is preferably in a range from 70 to 110 s.

According to an aspect 43 of the present invention, the coated effect pigment according to preceding aspects 34 to 42 is preferably produced by the method according to aspects 19 to 33.

According to an aspect 44 of the present invention, in the coated effect pigment according to any of the preceding aspects 34 to 43, the binder preferably has polyester functions and is prepared via a melt polymerization.

According to an aspect 45 of the present invention, in the coated effect pigment according to aspect 44, the binder is preferably a polyester containing acid and alcohol components and as acid components a main fraction is taken from monomers of the group consisting of isophthalic acid and terephthalic acid and mixtures thereof.

According to an aspect 46 of the present invention, in the coated effect pigment according to aspect 44 or 45, the binder comprises preferably as acid component at least 14 mol % of isophthalic acid, based on all the acid components.

According to an aspect 47 of the present invention, in the coated effect pigment according to any of aspects 44 to 46, the binder comprises preferably as alcohol component a fraction of neopentyl glycol and/or 2-butyl-2-ethyl-1,3-propanediol of 50 to 100 mol %, based on all the alcohol components.

According to an aspect 48 of the present invention, in the coated effect pigment according to aspect 47, with regard to the alcohol components of the polyester, the polyester preferably has a molar ratio of ethylene glycol and/or diethylene glycol to neopentyl glycol and/or 2-butyl-2-ethyl-1,3-propanediol of less than 20%.

According to an aspect 49 of the present invention, in the coated effect pigment according to any of the preceding aspects 34 to 48, the platelet-shaped substrate is preferably taken from the group consisting of metallic effect pigments, pearlescent pigments, and interference pigments, and also mixtures thereof.

According to an aspect 50 of the present invention, in the coated effect pigment according to aspect 49, the platelet-shaped substrate is preferably a pearlescent pigment or is a metallic effect pigment coated with a metal oxide.

According to an aspect 51 of the present invention, in the coated effect pigment according to aspect 50, the metal oxide is preferably taken from the group consisting of silicon (di)oxide, silicon oxide hydrate, silicon hydroxide, aluminum oxide, aluminum oxide hydrate, aluminum hydroxide, and mixtures thereof.

According to an aspect 52 of the present invention, in the coated effect pigment according to either of aspects 50 and 16, the platelet-shaped substrate is preferably an $SiO_2$-coated aluminum effect pigment.

According to an aspect 53 of the present invention, the coated effect pigments according to one of aspects 34 to 52 are used in paints, powder coatings, printing inks, toners or plastics.

A further subject of the present invention is a polymer according to the following aspects.

According to aspect 54 of the present invention, is preferably a polymer which may be a binder and has polyester functions and is precipitated spontaneously in a solvent or solvent mixture.

According to aspect 55 of the present invention, the polymer according to aspect 54 is preferably a binder for powder coating.

According to an aspect 56 of the present invention, the polymer according to either of aspects 54 and 55 is preferably characterized in that the binder is a polyester containing acid and alcohol components and as acid components a main fraction is taken from monomers of the group consisting of isophthalic acid and terephthalic acid and mixtures thereof.

According to an aspect 57 of the present invention, the polymer according to any of aspects 54 to 56 is preferably characterized in that the binder comprises as acid component at least 14 mol % of isophthalic acid, based on all the acid components.

According to an aspect 58 of the present invention, the polymer according to any of aspects 54 to 57 is preferably characterized in that the binder comprises as alcohol component a fraction of neopentyl glycol and/or 2-butyl-2-ethyl-1,3-propanediol of 50 to 100 mol %, based on all the alcohol components.

According to an aspect 59 of the present invention, the polymer according to aspect 58 is preferably characterized in that with regard to the alcohol components of the polyester, the polyester has a molar ratio of ethylene glycol and/or diethylene glycol to neopentyl glycol and/or 2-butyl-2-ethyl-1,3-propanediol of less than 20%.

According to an aspect 60 of the present invention, the polymer according to any of aspects 54 to 59 preferably has a crystalline and amorphous fraction which is determined by means of $^{13}C$ NMR MAS relaxation measurements, the relaxation of the $^{13}C$ nuclei being fitted as a biexponential relaxation according to the formula $$M(t, M_0, a, c, T_1^s, T_1^l) = M_0 \cdot \left[(1-c) \cdot \left(1 - a \cdot e^{-\left(\frac{t}{T_1^s}\right)}\right) + c \cdot \left(1 - a \cdot e^{-\left(\frac{t}{T_1^l}\right)}\right)\right]$$

where the degree of crystallinity c is in a range between 40% to 85% and where there are a short average relaxation time $T_1^s$ and a long average relaxation time $T_1^I$ and where $T_1^I$ is in a range from 65 to 130 s.

According to an aspect 61 of the present invention, the polymer according to aspect 60 preferably has a degree of crystallinity c of 45% to 75%.

According to an aspect 62 of the present invention, the polymer according to either of aspects 60 and 61 the long average relaxation time $T_1^I$ is preferably in a range from 70 to 110 s.

According to an aspect 63 of the present invention, the polymer of aspects 54 to 62 the binder is preferably not an LCST or UCST polymer.

According to an aspect 64 of the present invention, the polymer according to any of preceding aspects 54 to 63 is preferably the polymer in the PXRD diffractogram in Debye-Scherrer geometry (capillary 0.3 mm diameter) preferably has structured peaks with full widths at half maximum in the range from 0.7 to 2.0° (in 2θ), using Cu Kα1 as x-ray source and using germanium(111) with a slit width of 0.5 mm as monochromator.

According to an aspect 65 of the present invention, the polymer according to preceding aspects 54 to 64 preferably, in a DSC diagram at a rate of advance of 5° C./min, has at least one endothermic peak having a maximum from a range of $T_{max}$=100 to 150° C. and also having an enthalpy ΔH associated with this peak from a range from 15 J/g to 80 J/g, the enthalpy being calculated on the amount of the binder.

According to an aspect 66 of the present invention, the polymer is prepared preferably by a method according to any of aspects 69 to 81.

According to an aspect 67 of the present invention, the polymer according to any of aspects 73 to 85, the organic solvent is preferably selected from the group consisting of acetone, methyl ethyl ketone, ethyl acetate, and also mixtures thereof.

According to an aspect 68 of the present invention, the polymer according to any of aspects 54 to 67 is preferably used for the coating of platelet-shaped effect pigments.

According to an aspect 69, the present invention relates to a method for producing a polymer, comprising the following steps:
c1) dissolving a binder which is spontaneously precipitable in an organic solvent or solvent mixture within a first timespan of $t_{sol}$ at a temperature $T_{sol}$,
c2) subsequently precipitating the polymer within a second timespan $t_{insol}$ at a temperature $T_{insol}$, where the difference $\Delta T=T_{insol}-T_{sol}$ is in a range from 0 to 5° C. and there is spontaneous precipitation,
d1) removing the polymer from the solvent or solvent mixture, and
e) optionally drying out the polymer.

According to an aspect 70 of the present invention, in the method according to aspect 69, the method is preferably characterized in that the temperature $T_{insol}$ for step c1) or c2) is in a range from 10° C. to 5° C. below the boiling temperature of the solvent or solvent mixture.

According to an aspect 71 of the present invention, in the method according to aspect 70, the method is preferably characterized in that the temperature $T_{insol}$ for step c2) is in a range from 18° C. to 30° C.

According to an aspect 72 of the present invention, in the method according to aspect 69 to 71, the method is preferably characterized in that the temperature $T_{sol}$ for step c1) is preferably in a range from 10° C. to 5° C. below the boiling temperature of the solvent or solvent mixture.

According to an aspect 73 of the present invention, in the method according to aspect 72, the method is preferably characterized in that the temperature $T_{sol}$ for step c1) is in a range from 18° C. to 30° C.

According to an aspect 74 of the present invention, in the method according to any aspects 69 to 73, the method is preferably characterized in that $t_{insol}$ in step c2) is in a range from 0.5 h to 12 h.

According to an aspect 75 of the present invention, in the method according to any of aspects 69 to 74, the method is preferably characterized in that the organic solvent is selected from the group consisting of acetone, methyl ethyl ketone, ethyl acetate, and also mixtures thereof.

According to an aspect 76 of the present invention, in the method according to any of aspects 69 to 74, the method is preferably characterized in that the binder is not an LCST or UCST polymer.

According to an aspect 77 of the present invention, in the method according to any of aspects 69 to 76, the method is preferably characterized in that the binder has polyester functions and is prepared via a melt polymerization.

According to an aspect 78 of the present invention, in the method according to aspect 77, the method is preferably characterized in that the binder is a polyester containing acid and alcohol components and as acid components a main fraction is taken from monomers of the group consisting of isophthalic acid and terephthalic acid and mixtures thereof.

According to an aspect 79 of the present invention, in the method according to aspect 77 or 78, the method is preferably characterized in that the binder comprises as acid component at least 14 mol % of isophthalic acid, based on all the acid components.

According to an aspect 80 of the present invention, in the method for producing a coated effect pigment according to any of aspects 77 to 79, the method is preferably characterized in that the binder comprises as alcohol component a fraction of neopentyl glycol and/or 2-butyl-2-ethyl-1,3-propanediol of 50 to 100 mol %, based on all the alcohol components.

According to an aspect 81 of the present invention, in the method for producing a coated effect pigment according to aspect 80, the method is preferably characterized in that with regard to the alcohol components of the polyester it has a molar ratio of ethylene glycol and/or diethylene glycol to neopentyl glycol and/or 2-butyl-2-ethyl-1,3-propanediol of less than 20%.

EXAMPLES

A1 Preliminary Tests 1 to 15:

In the preliminary tests, a wide variety of different polyester binders, offered commercially as powder coating binders, were dissolved in solvents such as acetone, methyl ethyl ketone (MEK) or ethyl acetate at room temperature and then investigated for a possible spontaneous precipitation.

For this purpose, the solvent was charged to a glass beaker, the temperature was adjusted if necessary, and the binder powder (typically around ⅙ of the amount of the solvent) was added with stirring.

All binders which exhibited the spontaneous precipitation were first of all dissolved without residue, but in that case took the form of a slightly grayish solution, suggesting an at least partly colloidal state. Binders not displaying spontaneous precipitation (comparative examples) always dissolved in a colorless clear solution.

The spontaneous precipitation took place in different times: these times may have amounted to several minutes up to around 48 hours. The precipitated polymers were isolated via a VWR filter paper 454 (particle retention: 12-15 μm) and dried in a vacuum drying cabinet at 50° C. for 6 h. These polymer powders could then be analyzed further.

Systematic investigations on a number of selected polymers showed that the precipitation accomplished was at least 90%, and in the majority of cases largely quantitative.

All results in this regard are summarized in table 1.

Preliminary Test Comparative Examples 1 to 3

The binders CC 340, CC 2818-0 (both Allnex), and Uralac P 1580 (DSM) were dissolved in acetone, ethyl acetate or methyl ethyl ketone, but no longer precipitated.

These binders are therefore not spontaneously precipitable in the sense of this invention.

Preliminary Test Comparative Examples 4 to 6

In preliminary tests, an attempt was made to dissolve the semicrystalline powder coating polyester resins UVCOAT 9010, Additol P791, and Crylcoat-8078-0 (all from Allnex) in ethyl acetate, acetone, and methyl ethyl ketone, at room temperature and also at various temperatures up to 5° C. below the respective boiling temperature. The resins, however, could not be dissolved to a sufficient degree corresponding to the invention.

These binders are therefore not spontaneously precipitable in the sense of this invention.

These resins, and analysis could be carried out, were investigated for their monomer composition (see table 1) and characterized by DSC (see table 2).

A2 Structure of Binders

The binders were analyzed for their monomer composition by customary methods of polymer analysis such as, for example, GC-mass spectroscopy, IR spectra, and NMR ($^1$H, $^{13}$C, and also 2-D NMR). In these analyses, some of the acid monomer components present in very small amount were subsumed collectively under "other acids".

Table 1 provides an overview of the binders investigated. Also reported here, very generally, are the precipitation time and also the results of the monomer constituent analysis. For each sample here, the amounts of isophthalic or of terephthalic acid (preliminary test comparative example 3) were taken as 100 parts in each case, and all other components were expressed in proportion to them.

In further preliminary test examples, the procedure of example 1 was repeated, using a wide variety of different polyester resins suitable for powder coatings.

The results of the dissolution tests in acetone at room temperature, and also the analytically determined monomer compositions, are shown in table 1. Similar results were also obtained in solvents such as ethyl acetate or methyl ethyl ketone (MEK).

In very apolar solvents such as chloroform, the binders dissolved completely, to give a clear solution. There was, however, no precipitation.

All in all, out of twenty-one polyester binders investigated, fifteen displayed the behavior of spontaneous precipitation (preliminary test examples 1-15), while three binders, though dissolving in the solvent, no longer underwent spontaneous precipitation (preliminary test comparative examples 1-3) and three further binders were not soluble (preliminary test comparative examples 4-6).

The majority of these binders were also tested in ethyl acetate and also in methyl ethyl ketone, leading to similar results.

TABLE 1

**Dissolution behavior in acetone and analytical monomer composition of the polyester binders of preliminary tests

| | | | | Analytically determined relative amount of monomers (based on 100 parts isophthalic acid or terephthalic acid) | | | | | |
|---|---|---|---|---|---|---|---|---|---|
| Example | Binder | Manu-facturer | Pre-cipitation time | Isoph-thalic acid | Tere-phthalic acid | Other acids | Neopentyl glycol | Trimethylol-propane (TMP) | Ethylene glycol/diethylene glycol |
| Preliminary test example 1 | CC* 4540-0 | Allnex | <3 h | 100 | 1.8 | — | 92.1 | 2.5 | 4.8 |
| Preliminary test example 2 | Uralac P 3480 | DSM | <3 h | 100 | 3 | 0.2 | 94 | 2 | |
| Preliminary test example I 3 | Uralac P 3495 | DSM | <20 h | 100 | 362 | 9 | 442 | | |
| Preliminary test example 4 | CC 2578-0 | Allnex | <42 h | 100 | 450 | 4 | 505 | 8 | |
| Preliminary test example I 5 | CC 4420-0 | Allnex | <20 h | 100 | | | 82 | 7 | |
| Preliminary test example 6 | Uralac P800 | DSM | <1 min | 100 | 5.2 | | 98.3 | 0.9 | 2.3 |
| Preliminary test example 7 | CC 4626-0 | Allnex | <1 min | 100 | 1.3 | | 92.5 | | |
| Preliminary test example I 8 | Uralac P6800 | DSM | <3 h | 100 | 1.5 | | 84.5 | 5 | 7.6 |
| Preliminary test example 9 | CC 4655-2 | Allnex | <3 h | 100 | <1 | | 87.7 | 3.6 | 5.9 |

TABLE 1-continued

**Dissolution behavior in acetone and analytical monomer composition of the polyester binders of preliminary tests

| Example | Binder | Manu-facturer | Pre-cipitation time | Analytically determined relative amount of monomers (based on 100 parts isophthalic acid or terephthalic acid) | | | | | |
|---|---|---|---|---|---|---|---|---|---|
| | | | | Isoph-thalic acid | Tere-phthalic acid | Other acids | Neopentyl glycol | Trimethylol-propane (TMP) | Ethylene glycol/diethylene glycol |
| Preliminary test example 10 | CC 2506-1 | Allnex | <3 h | 100 | 435.8 | | 508.2 | | |
| Preliminary test example 11 | CC 2505-4 | Allnex | <3 h | 100 | 545 | 17 | 587 | 47.2 | |
| Preliminary test example 12 | P 3486 | Allnex | <42 h | 100 | 592.3 | | 653.2 | 6 | 11.1 |
| Preliminary test example 13 | CC 4890-0 | Allnex | <3 h | 100 | 1.6 | | 112 | 3 | 7.5 |
| Preliminary test example 14 | Sirales 7499 | SIR | <3 h | 100 | 2.6 | | 98.2 | | |
| Preliminary test example 15 | Uralac P 5500 | DSM | <3 h | 100 | | 12.4 | 90.7 | 1.8 | |
| Preliminary test comparative example 1 | CC 340** | Allnex | No pre-cipitation | | 100 | | 82.1 | | 27.5 |
| Preliminary test comparative example 2 | Uralac P 1580 | DSM | No pre-cipitation | 100 | | | 67 | 18 | 15 |
| Preliminary test comparative example 3 | CC 2818 | Allnex | No pre-cipitation | 0 | 100 | | 0 | 14.7 | 89.6 |
| Preliminary test example 4 | UVCOAT 9010 | Allnex | No dissolution | | | 100.5*** | | | 100 to 105 (Ethylene glycol) |
| Preliminary test example 5 | Additol***** P791 | DSM | No dissolution | | | **** | | | |
| Preliminary test example 6 | CC-8079-0 | Allnex | No dissolution | | | 100***** | | 2.4 | trans-1,4-dimethylolcyclo-hexane: 61.0; cis-1,4-dimethylolcyclo-hexane: 34.1 |

*The code CC stands for "Crylcoat"
**Binders of the examples from EP 1 699 884 B1
***Dodecanoic acid
****This product dissolved only in minimal amounts in DMSO and no analysis could therefore be conducted. It is an ester of 1,12-dodecanoic acid.
*****Adipic acid The binders of preliminary test comparative examples 1-3 showed a high fraction of ethylene glycol and/or of trimethylolpropane in comparison to neopentyl glycol.

Three further binders, sold by their manufacturers as semicrystalline powder coating binders, could not be sufficiently dissolved (preliminary test comparative examples 4-6). These binders as their acid component had a main fraction of adipic acid (preliminary test example 5) or of 1,12-dodecanoic acid. The alcohol components present, where analyzable, included no detectable amounts of neopentyl glycol, but instead were ethylene glycol (preliminary test example 4) or a mixture of cis- and trans-dimethylolcyclohexane.

Evidently these binders already have a crystalline fraction which is such that they cannot be dissolved and consequently also no longer exhibit any "spontaneous polymerization".

DSC Investigations on Binders of the Preliminary Tests:

For inventive examples of the preliminary tests, DSC investigations were additionally conducted. In these investigations, small, defined amounts (a few mg) both of the precipitated and dry binder (preliminary test examples) and also, for comparison, of the unprecipitated, dry binder, as obtained from the manufacturer (preliminary test comparative examples), were weighed out and DSC measurements were conducted (instrument manufacturer: Netzsch, Germany; model STA 449 F3 Jupiter; comparison standard: indium). The rate of advance here was 5° K/min and the temperature range extended in general from 30° C. to 250° C. The sample, without a waiting time, was subsequently cooled at 5 K/min down to 40° C. and, after a waiting time of 20 minutes at this temperature, a second temperature run was recorded at 5 K/min up to 250° C. The measurements took place under air, since no reactivity with oxygen could be ascertained.

In these investigations, in the case of the unprecipitated comparison samples, there was in each case an endothermic peak having a maximum in a region of above 60 to around 75° C., and with a corresponding $T_{onset}$ of around 55 to below 70° C. Situated below these peaks, as a general rule, is a glass transition temperature $T_g$, which in a DSC is known to be manifested in a shift in the baseline. This glass transition temperature can be assigned primarily to the amorphous fractions of the polymer. This behavior in DSC is known for these polyester binders and is entirely customary. The peak may well be attributable to the melting of certain small crystalline fractions.

In the case of the spontaneously precipitated samples, in contrast, substantially larger endothermic peaks were found, having a maximum $T_{max}$ in a range from around 120 to around 135° C. and having a corresponding $T_{onset}$ of around 100 to 124° C. Here again, there may also be a glass transition temperature below the peak. The backward temperature run of all samples was always substantially without structure, with no distinctly identifiable peaks.

This is a clear indication that the strongly shifted and enlarged endothermic peaks are attributable to a substantial increase in the crystalline fractions of the polyester resins investigated, as a result of the spontaneous precipitation.

Where a second measurement after the first temperature cycle was conducted for the spontaneously precipitated samples, the behavior found was always similar to that of the unprecipitated samples.

FIG. 1 shows by way of example the forward temperature runs for preliminary test example 1. The unprecipitated polymer as obtained from the manufacturer (preliminary test comparative example 1) exhibits an endothermic peak with a maximum at 70.1° C. The precipitated polymer, in contrast, exhibits an endothermic peak at 126.2° C. and a much higher enthalpy (preliminary test example 1). If a DSC spectrum is again recorded for this polymer, after the backward run to 30° C., the subsequent DSC scan is highly comparable with that of the unprecipitated polymer (preliminary test comparative example 1 b, $T_{max}$ at 71.5° C.). The crystalline structure obtained as a result of the spontaneous precipitation has evidently been destroyed irreversibly at higher temperatures.

If, however, this polymer were to be redissolved in the solvent and spontaneously precipitated, then again a DSC curve resembling that of preliminary test example 1 would be obtained (not shown in FIG. 1). The crystallization procedure is in this sense reversible.

For all of the DSC tests, TGA measurements were carried out simultaneously. For some samples, decreases in mass in the range from 1 to around 2 wt % were found. It was generally possible here to observe a first step at a temperature of around 50° C. This step can be interpreted as the removal at this point of residual traces of the solvent from the precipitated polymer.

The peaks were integrated in order to calculate the associated enthalpy ΔH. Table 2 gives an overview of the measurement data obtained. It shows the onset temperatures $T_{onset}$, the maximum temperatures $T_{max}$ and also the enthalpies ΔH associated with the peaks (following subtraction of a customary background correction) of the endothermic peaks for the unprecipitated binder samples (preliminary test comparative examples) and also for the precipitated samples (preliminary test examples). Also shown are the shifts of these parameters, for which in each case the value for the unprecipitated binder was subtracted from that for the precipitated binder. In the case of the enthalpies, a ratio was formed of the precipitated to the unprecipitated polyester resin.

This massive temperature shift in the $T_{max}$ values, and also the sharp increase of the associated enthalpy of the endothermic peaks, can be attributed to a substantial increase in the crystalline fractions of the polymers, as a result of the spontaneous precipitation.

TABLE 2

$T_{onset}$, $T_{max}$ and ΔH parameters from DSC measurements on precipitated binders (preliminary test examples) and unprecipitated binders (preliminary test comparative examples)

| Example | Binder | Unprecipitated binder (preliminary test comparative examples) | | | Precipitated binder (inventive preliminary test examples) | | | Comparison (precipitated minus unprecipitated binder) | | |
|---|---|---|---|---|---|---|---|---|---|---|
| | | $T_{onset}$ [° C.] | $T_{max}$ [° C.] | $\Delta H_{AGM}$ [J/g] | $T_{onset}$ [° C.] | $T_{max}$ [° C.] | ΔH/ [J/g] | $\Delta T_{onset}$ [° C.] | $\Delta T_{max}$ [° C.] | $\Delta H_{precip}/\Delta H_{AGM}$ |
| Preliminary test example 1 | CC 4540-0 | 65.6 | 70.1 | 9.4 | 100.5 | 126.2 | 55.0 | 34.9 | 56.1 | 5.9 |
| Preliminary test example 2 | P 3480 | 66.9 | 71.2 | 8.0 | 104.5 | 128.8 | 44.0 | 37.6 | 57.6 | 5.5 |
| Preliminary test example 3 | P 3495 | 64.6 | 71.1 | 5.1 | 105.4 | 129 | 30.9 | 40.8 | 57.9 | 6.0 |
| Preliminary test example 4 | CC 2578-0 | 70.1 | 73.5 | 6.9 | 107.1 | 130.5 | 32.2 | 37.0 | 57 | 4.7 |
| Preliminary test example 5 | CC 4420-0 | 64 | 71.3 | 7.4 | 105.7 | 123.4 | 38.2 | 41.7 | 51.7 | 5.2 |
| Preliminary test example 6 | P800 | 65.4 | 69.3 | 7.9 | 124 | 132.5 | 38.2 | 58.6 | 67.2 | 6.1 |
| Preliminary test example 7 | CC 4626-0 | 63.8 | 67.7 | 10.1 | 127 | 134.1 | 51.4 | 63.2 | 66.4 | 5.1 |

TABLE 2-continued $T_{onset}$, $T_{max}$ and ΔH parameters from DSC measurements on precipitated binders
(preliminary test examples) and unprecipitated binders (preliminary test comparative examples)

| Example | Binder | Unprecipitated binder (preliminary test comparative examples) | | | Precipitated binder (inventive preliminary test examples) | | | Comparison (precipitated minus unprecipitated binder) | | |
|---|---|---|---|---|---|---|---|---|---|---|
| | | $T_{onset}$ [° C.] | $T_{max}$ [° C.] | $ΔH_{AGM}$ [J/g] | $T_{onset}$ [° C.] | $T_{max}$ [° C.] | ΔH/ [J/g] | $ΔT_{onset}$ [° C.] | $ΔT_{max}$ [° C.] | $ΔH_{precip}/ΔH_{AGM}$ |
| Preliminary test example 8 | P 6800 | 63.8 | 66.6 | 8.5 | 115.8 | 124.5 | 42.2 | 52.0 | 57.9 | 5.0 |
| Preliminary test example 9 | CC 4655-2 | 67.8 | 72 | 8.5 | 117 | 125.3 | 41.9 | 49.2 | 53.3 | 4.9 |
| Preliminary test example 10 | CC 2506-1 | 68.3 | 71.7 | 6.2 | 106.2 | 132.2 | 35.0 | 37.9 | 60.6 | 5.6 |
| Preliminary test example 11 | CC 2505-4 | 64.8 | 68.9 | 6.0 | 110.1 | 130.7 | 32.8 | 45.3 | 61.8 | 5.5 |
| Preliminary test example 12 | P 3486 | 64.6 | 67.1 | 5.2 | 110.2 | 134.5 | 35.6 | 45.6 | 67.4 | 6.8 |
| Preliminary test example 13 | CC 4890-0 | 66.8 | 69.8 | 8.7 | 105.4 | 125.9 | 43.0 | 38.6 | 56.1 | 4.9 |
| Preliminary test example 14 | Sir 7499 | 66.8 | 69.9 | 8.3 | 106.8 | 126.7 | 45.3 | 40.0 | 56.8 | 5.5 |
| Preliminary test example 15 | P 5500 | 59.6 | 62.7 | 9.0 | 103.4 | 120 | 38. | 43.8 | 53.3 | 4.2 |
| Preliminary test example 4 | UVCOAT 9010 | 79.5 | 84.1 | 105.1 | — | — | — | — | — | — |
| Preliminary test example 5 | Additol P791 | 86.5 | 94.3 | 191.1 | — | — | — | — | — | — |
| Preliminary test example 6 | Crylcoat-8079-0 | 86.4 | 92.5/99.7 | 34.6 | — | — | — | — | — | — |

The very high values for the melting range from 120 to more than 132° C. are known similarly in the literature only for the so-called "semicrystalline" polyesters (EP 0 521 992 B1, U.S. Pat. No. 4,217,426). There, similar enthalpy values are also reported.

It is striking here, however, that on the basis of the monomer composition, the binders are known more as "amorphous" binders (e.g., U.S. Pat. No. 6,660,398 B1). The degree of crystallization achieved through the spontaneous precipitation is seemingly very high.

The enthalpy values of the preliminary test comparative examples 4 and 5 (measured only in the first scan), at 105.1 and 191.1 J/g, were higher still than all of the measured enthalpy values of the inventive examples after the precipitation. This appears to reflect an even higher degree of crystallization. These binders are evidently so highly crystalline that they cannot be dissolved in the solvents used here and therefore do not enter into spontaneous crystallization.

B Coating of Effect Pigments:

Example 1

An open 1-liter jacketed reactor was used, cooled with a cryostat to 15° C. 60.0 g of $SiO_2$ coated aluminum effect pigment (STANDART® PCS 3500, available from Eckart GmbH) with an average particle size $D_{50}$ of 35 μm were introduced and suspended in 250 g of acetone. Via a vibratory chute, over a time of 60 min, 63.0 g of a carboxyl-group-containing, saturated polyester resin with the designation Crylcoat 4540-0 (manufacturer: Allnex S.à.r.l.) were added to the suspension. After the end of the addition, the suspension was stirred for 2 hours and then discharged via a suction filter. The precipitate obtained was dried for an hour in a heatable Duplex kneader (model HKD-T06D, from IKA®-Werke GmbH & Co. KG) under reduced pressure at 80 mbar and 35° C., and then sieved through a sieve having a mesh size of below 100 μm.

Example 2

The procedure of example 1 was repeated, but using as the polyester resin the resin with the designation Sirales PE 7499 (manufacturer: SIR Industriale SpA) (corresponding to preliminary test 14).

Example 3

The procedure of example 1 was repeated, but using as the polyester resin the resin with the designation CC 2506-1 (manufacturer: Allnex S.à.r.l.) (corresponding to preliminary test 10).

Example 4

The procedure of example 1 was repeated, but using, as effect pigment, 60.0 g of $SiO_2$ coated gold bronze pigment Dorolan Reichbleichgold 17/0.

Example 5

The procedure of example 1 was repeated, but using, as effect pigment, 60.0 g pearlescent pigment Luxan E221 (from Eckart GmbH, Germany).

Example 6

The procedure of example 1 was repeated, but using ethyl acetate instead of acetone as solvent and, before the addition of the binder, adding 1.0 g of Disperbyk 2060 to the metallic effect pigment suspension and stirring for 1 h before the binder was added. After the end of the addition, the suspension was stirred for 2 hours and thereafter the suspension was left to stand for 1 h. An only slightly turbid solvent supernatant was formed, while the coated metallic effect pigment underwent sedimentation.

If a corresponding procedure was adopted with the formula according to example 1 without addition of additive, then the supernatant was much more turbid. In light micrographs and also in SEM micrographs it could be seen that the metallic effect pigment in the case of example 6 was coated better and more uniformly with polymer than in the case of example 1, for which some secondary precipitation was observed.

Example 7

The procedure of example 6 was repeated, but before the addition of Disperbyk 2060 to the suspension of the metallic effect pigment, it was admixed with 2.0 g of Dynasylan Glymo (from Evonik Industries AG) and stirred at room temperature for 1 h.

The quantity of polymer precipitation was comparable with example 6.

Comparative Example 1 (Based on EP 1 699 884 B1)

195 g of the polyester resin Crylcoat 2818-0 (from Allnex S.à.r.l.) and also, as curing component, 105 g of a polyisocyanate adduct with the designation Vestagon BF 1320 (manufacturer: Evonik) were dissolved in 1800 g of acetone, and 200 g of $SiO_2$ coated aluminum effect pigment (STANDART® PCS 3500, available from Eckart GmbH) were dispersed. The dispersion was sprayed in a spray drier at a rate of 30 g/min with a spraying pressure of 2.5 bar in an air stream whose temperature was 55° C. After drying, a yield of 380 g of coated effect pigment was obtained.

Comparative Example 2

Coating as in comparative example 1, but using 200 g of pearlescent pigment Luxan E221 (from Eckart GmbH, Germany) as substrate.

Comparative Example 3: Use of a UCST Polymer Based on DE 102 43 438 A1

The metallic effect pigment was suspended as in example 1, but using 250 g of deionized water as solvent. The polymer added was 63 g of LUVITEC® VPC 55 K 65 W (UCST polymer from BASF with cloud point temperature of around 65° C. in water). The temperature was then raised to 75° C. over the course of an hour, and the mixture was left at this temperature for an hour. Subsequently, the dispersion was filtered while still hot.

In contrast to the inventive examples, the resulting precipitate was highly tenacious, attributable to substantial agglomeration of the pigment particles. The agglomeration proved to be so substantial that further testing of the pigments did not appear useful.

In further comparative tests, the precipitation temperature was varied, and ethyl acetate instead of water was used as solvent; however, agglomerates were always produced.

B1 Performance Properties
B 1.1 Storage Stability Tests:

In a method based on DIN EN ISO 8130-8, 50 g of pigment powder from the inventive examples and the comparative examples were introduced in each case into a sealable aluminum can and stored in a heating cabinet at 60° C. for 28 days. After the end of the time, the consistency was assessed and scored on the criteria below, relative to a comparison sample stored at room temperature.

TABLE 3

The storage tests were based on the following evaluation system:

| Index | Extent of solidification or agglomeration |
|---|---|
| 0 | No change |
| 1 | Slight signs of solidification; agglomerates could easily be disrupted. |
| 2 | Significant solidification. Some effort is required to disperse the powder coating. Agglomerates can be disrupted by manual pressure. |
| 3[1] | Considerable solidification, making it difficult or impossible to disperse the powder coating. Agglomerates are very stable and require the application of machine means for disruption. |

[1]If a product is classed with the index 3, it should be considered whether further examination is necessary, since the powder coating probably cannot be used to satisfaction.

TABLE 4

Results of the storage tests:

| Sample | Storage test index |
|---|---|
| Example 1 | 0 |
| Example 2 | 0 |
| Example 3 | 0 |
| Example 4 | 0 |
| Example 5 | 0 |
| Example 6 | 0 |
| Example 7 | 0 |
| Comparative example 1 | 3 |
| Comparative example 2 | 3 |

All of the inventive examples and also comparative examples 2 to 5 showed outstanding storage stability (index 0). The storage stability of comparative examples 1 and 2 was evaluated only as of index 3, however.

The improved storage stability is very probably attributable to the increased degree of crystallization of the binder coatings of the inventive examples.

B 1.2: Robustness of Adhesion of the Polymer Coat:

An important criterion of the product of the invention is the adhesion of the resin coat on the effect pigment surface. The resin coat is subject to severe exposure during the production steps of drying and sieving and also in the further processing steps by the user of the products of the invention.

In order to determine the adhesion to the resin coat on the effect pigment surface, the specimens of inventive examples 1, 6 and 7 were subjected to determination of the particle number and particle size. In this case, size measurements were performed in a Sysmex FPIA-3000S. The $CE_{50}$ is the size value for which 50% of the equivalent circle size of the measured particles in a cumulative size distribution are smaller than this value (number average). The instrument had an ultrasound unit for dispersing the specimens. This dispersing amounts to 15 watts with adjustable amplitude and at a frequency of 30 kHz.

The specimens were measured without ultrasound exposure and, in order to simulate mechanical loads during processing steps, were measured with ultrasound at 20% and 60% amplitude.

Table 5 below illustrates the results:

TABLE 5

$CE_{50}$ values and measured particle number (determined using Sysmex FPIA 3000S):

| Parameters | Sample | Ultrasound 15 W, frequency 30 kHz Amplitude | | |
|---|---|---|---|---|
| | | none | 20% | 60% |
| $CE_{50}/\mu m$ | Example 7 | 3.20 | 1.98 | 1.80 |
| | Example 6 | 2.79 | 1.64 | 1.58 |
| Particle number | Example 7 | 1958 | 5482 | 7066 |
| | Example 6 | 2810 | 8484 | 10 992 |

The samples of example 6 consistently showed lower $CE_{50}$ values and higher particle numbers than those of example 7. This is attributable to increased secondary precipitation of the polymer coating. This secondary precipitation is usually substantially smaller than the effect pigments. With increasing amplitude and hence increasing energy input in the ultrasound treatment, the $CE_{50}$ values fall in both cases. Here, evidently, the pigments are reduced in size and/or there is partial abrasion of the polymer coating.

Accordingly, the polymer coating in the case of example 7 is bonded better on the pigment surface than in the case of example 6, which is probably attributable to the mediation of adhesion by the epoxy silane.

B2 Analytical Investigations

B 2.1 DSC Measurements:

In analogy to the preliminary tests, DSC investigations were performed using an instrument from Netzsch (model STA 449 F3 Jupiter) on the inventive examples. The binder contents of the coated effect pigments were analyzed. The curve profiles in the DSC measurements corresponded to those of the preliminary tests. The positions of the onset temperatures and maximum temperatures in the endothermic peaks corresponded largely to those of the corresponding preliminary tests. The enthalpies of the endothermic peaks were converted for these amounts of binder. A very good match was found with the preliminary tests, with deviations in the range of +/−5%.

B 2.2 PXRD Powder Diffractograms

All powder diffraction measurements were taken on a STOE StadiP diffractometer in Debye-Scherrer geometry in transmission at room temperature. The diffractometer is equipped with copper radiation and a germanium monochromator (111), so that only the $Cu_{K\alpha 1}$ band ($\lambda=1.5406$ Å) is used for the diffraction. The generator power was set at 40 kV and 40 mA in order to ensure an optimum ratio of background to Bragg scattering. To limit the beam divergence, a 0.5 mm collimator was used in front of the sample. All measurements were carried out in a 2θ range between 5° and 70° using a Mythen detector (from Dectris) with a detection window at 64×8 mm, corresponding to an opening angle of 19° in 2θ. The detector was operated in 0.2° steps with an exposure time of 90 s for each step. The individual measurements are summated. This leads to a measuring time of 8 h and 8 min for each sample. The samples were prepared in 0.3 mm borosilicate glass capillaries (from Hilgenberg, Mark-tubes).

B 2.3 $C^{13}$ MAS NMR Overview Measurements

All high-resolution one dimensional $^{13}C$ NMR spectra (e.g., FIGS. 4 and 6) were recorded on an Avance III HD Fourier-transform NMR spectrometer from Bruker. The spectrometer is equipped with three channels and a "wide bore" magnet (cryomagnet) with a magnetic field strength of 9.4 T. This corresponds to Larmor frequencies of 400.13 MHz for $^1H$ nuclei and of 100.62 MHz for $^{13}C$ nuclei. The samples were placed in 4 mm zirconium dioxide rotors and transferred into a 4 mm MAS double resonance sample head from Bruker. During the measurements, the rotational frequency of the sample holder was 12.5 kHz for the pure polymers (preliminary test examples 1, 10 and 15 and also preliminary test comparative examples 1, 10 and 15) and 8.0 kHz for the coated aluminum particles (example 1). Excitation was effected by cross-polarization, using a CW pulse on the $^{13}C$ channel and a shape pulse on the $^1H$ channel. By means of the shape pulse, the $^1H$ polarization was transferred in a customary way to the $^{13}C$ nuclei. FIG. 2a outlines the pulse sequences used. During the shape pulse, the pulse amplitude was increased linearly by a factor of two during the Hartmann-Hahn block. The initiating proton-90° pulse was adjusted to a length of 2.5 µs, and the nutation frequencies of 1H and $^{13}C$ during the Hartmann-Hahn block were 65 kHz (averaged over shape) and 53 kHz. The Hartman-Hahn condition for the transfer of the magnetizations from protons to the $^{13}C$ nuclei is, as is known, as follows: $<v(^1H)>-v(^{13}C)=n*v_{rot}$ with n generally=±1. A 3 ms duration of the Hartmann-Hahn block (contact time) yielded optimum transfer efficiencies. The repeat time of 1 s was selected so as to allow more than 90% of the proton magnetization to relax into the thermal equilibrium in all cases. The recording of the FID was accompanied by broadband proton decoupling by means of a SPINAL64 sequence (described in B. M. Fung, A. K. Khitrin, K. Ermolaev, *J. Magn. Reson.* 2000, 142, 97-104), in which the proton nutation frequency was adjusted to 73 kHz and the time interval between the individual phase shifts was adjusted to 7.2 µs. In an acquisition time of 40 ms, 4096 points were recorded for the FID (Free Induction Decay). While 4096 transients were accumulated for the pure polymer samples (preliminary tests), the low sensitivity in the case of the coated aluminum particles (example 1) necessitated 51 600 repetitions. The 1D spectra were obtained by subsequent Fourier transformation with a "zero filling" of 4096 points and with folding using a Lorentz line with a full width at half maximum of 10 Hz. All chemical shifts for $^{13}C$ are reported relative to the standard TMS (0 ppm).

$^{13}C$ MAS NMR overview measurements were prepared for the polymer samples of preliminary test examples 1, 10 and 17 (spontaneously precipitated polymers) and also of the corresponding preliminary test comparative examples 1, 10 and 17 (polymer samples in the original state) and also for example 1. FIG. 4 shows by way of example the spectra of example 1, preliminary test example 1, and preliminary test comparative example 1. The figure also includes the chemical formulae of the structural elements of the polyester and their assignment to the peaks in the NMR spectrum.

FIG. 6 shows by way of example the spectra of example 10, preliminary test example 10, and preliminary test comparative example 10. More clearly in comparison to FIG. 4 it is possible to make out a double structure in the region of 130 ppm, owing to the high terephthalic acid fraction of the binder.

The precipitated, semicrystalline polymers in each case show clearly more effectively structured $^{13}$C NMR spectra than the unprecipitated, amorphous polymers. In the case of the coated aluminum pigment (example 1), the structures are not entirely too pronounced as in the case of the pure polymer (preliminary test example 1). This may be due to the greater susceptibility differences in this sample.

The full widths at half maximum of the $^{13}$C MAS spectra were between 250 and 350 Hz for the amorphous samples (preliminary test comparative examples 1, 10 and 17) and between 100 and 180 Hz for the semicrystalline polymers (preliminary test examples 1, 10 and 17). That of the coated Al particles (example 1) was between 180 and 270 Hz.

Since it was not possible from the full widths at half maximum alone to determine the degree of crystallization, $^{13}$C NMR MAS relaxation measurements were conducted as well.

B 2.4 $^{13}$C NMR MAS Relaxation Measurements:

All of the measurements of the $^{13}$C spin-lattice relaxation ($T_1$) were carried out on an Avance II Fourier-transform NMR spectrometer from Bruker. This spectrometer is equipped with three channels and a "wide bore" magnet with a magnetic field strength of 7.05 T. This corresponds to Larmor frequencies for $^1$H and $^{13}$C of 300.15 MHz and 75.48 MHz. The samples were introduced into 7 mm zirconium dioxide rotors and transferred into a 7 mm MAS triple resonance sample head from Bruker. During the measurements, the rotational frequency of the sample holder was 6 kHz. The low rotational frequency was selected so as to minimize the effect of the rotational frequency on the spin-lattice relaxation by quenching of the spin diffusion in the proton bath. Recording took place with a saturation sequence. The saturation block contained ten $^{13}$C-90° pulses with a length of 3.5 µs for the pure polymers of the preliminary test examples and comparative examples, and 7.0 µs for the coated Al particles (example 1), and also a dephasing interval of 20 ms between them. At the end of the saturation block, the residual magnetization was less than 0.1%, with the greatest fraction of the falling magnetization having been caused by the rapid relaxation of the methyl resonance. The saturation block was followed by a variable waiting time of between 100 µs and 1400 s, in which the longitudinal magnetization builds up again, depending on this waiting time and on the time constant $T_1$. The waiting times were selected with an exponential difference such that six values were measured in each full decade. For detection of the re-established polarization, the latter was converted into transverse, observable magnetization by means of a 90° read pulse on the $^{13}$C channel with a length of, again, 3.5 µs and 7.0 µs. The resulting FID was recorded with an acquisition time of 15 ms and with 2048 points under broadband proton decoupling with a SPINAL64 sequence. For the latter, the proton nutation frequency was 75 kHz and the time interval between the individual phase shifts was 7.4 µs. In the case of the pure polymer samples (preliminary test examples and comparative examples), 64 transients were recorded for each FID at each waiting time. For the coated Al particles (example 1), the number of repetitions for each FID was 1200. FIG. 2b gives a schematic overview of the pulse sequences used.

In order to enable frequency-resolved evaluation of the spin-lattice relaxation, the pseudo-2D data obtained were Fourier-transformed along the F2 domain. For this purpose, a "zero filling" of 2048 points and a fold with a Lorentz line with a full width at half maximum of 50 Hz was used. All chemical shifts for $^{13}$C are again reported relative to the standard TMS (0 ppm). The spectra thus obtained were baseline-corrected by adapting the spectra using a "cubic spline" interpolation for the shortest waiting time which still contained no significant spectral intensity. The resulting fitted curve was then subtracted from all other spectra. This was followed by integration over the resonances of the characteristic chemical structural units, by summation of the intensities. The baseline correction and integration were conducted using the program package Matlab version R2014b (8.4.0.150421) from MathWorks. The following spectral ranges were integrated: 17-28 ppm (Me-), 61-78 ppm (—$CH_2$—), 30-40 ppm ($C_q$), 124-140 ppm (—$C_{aromatic}$—), and 160-170 ppm (—$CO_2$—). The integral intensities[1] were adapted biexponentially as a function of the waiting time t by means of equation (1). This was done using a Levenberg-Marquardt algorithm in its implementation in the program gnuplot (version 4.6 patch level 5) with a weighting of 1.0 for each data point in the sum of the least square errors.

$$M(t, M_0, a, c, T_1^s, T_1^I) = \qquad (II)$$
$$M_0 \cdot \left[ (1-c) \cdot \left( 1 - a \cdot e^{-\left(\frac{t}{T_1^s}\right)} \right) + c \cdot \left( 1 - a \cdot e^{-\left(\frac{t}{T_1^I}\right)} \right) \right]$$

The equilibrium magnetization $M_0$ was adapted separately as the mean of the intensities for the greatest waiting times, and was no longer altered in the overall refinements. In the case of the Levenberg-Marquardt algorithm used, only the variables a, c, $T_1^s$ and $T_1^I$ were changed. For this purpose, with regard to the measurements, it is necessary to bear in mind that the intensities no longer rise systematically, at least for the last three measurement values. Parameter a takes account of nonzero initial magnetizations and can therefore be viewed as a technical variable for the refinement that is otherwise not relevant for determining the crystalline fraction in the polymers and coated Al particles. Parameter a reflects the efficiency of the saturation block and of the baseline correction, and ought to be close to 1.0 on complete elimination of the magnetization at t=0. For the measurements carried out here, a varied between 0.92 and 1.1.

For the determination of the degree of crystallinity there are therefore three variables remaining—the two time constants of the spin-lattice relaxation, $T_1^s$ and $T_1^I$, and also the weighting c. $T_1^s$ and $T_1^I$ differed very significantly and were therefore easy to separate. Together with the powder diffractograms (FIG. 3), this suggests a heterogeneous nature to the samples, in which an unordered (amorphous) and an ordered (crystalline) region can be distinguished. The rapid spin-lattice relaxation with the time constant $T_1^s$ is assigned, on the basis of the more efficient relaxation, to the amorphous region, where greater dynamism is expected. Correspondingly, $T_1^I$ is characteristic for the crystalline region. The constant c describes, correspondingly, the fraction of the crystalline regions in atom percent. FIGS. 5 and 7 show by way of example the typical profile of the extent of relaxation $\Phi=(M_0-M(t))/M_0$ against the waiting time t. The y-axis is plotted logarithmically, and so the individual relaxation components appear as straight lines.

The results of the evaluations of the relaxation measurements carried out are set out in tab. 6. In this case, the signals of the methyl groups were disregarded, since, as is known, they relax very rapidly owing to the spin-rotation relaxation between C atoms and adjacent H atoms, meaning that no difference can be detected between crystalline and amorphous fractions.

examples (39.7 to 47.8 s). In the parameter c, however, there are no clear delimitations apparent as in the case of the parameter $T_1^I$. All of the samples investigated have degrees of crystallization c of around 70%.

Overall, these findings can be interpreted to mean that the unprecipitated binder polymers already have a certain pre-order with a very low spatial extent. In the case of the precipitated binder polymers, however, the ordered regions increase sharply spatially, leading to longer relaxation times $T_1^I$.

Because the $^{13}C$ NMR relaxation measurements outlined here are a method that is extremely sensitive at a molecular

TABLE 6

Results of the evaluations of the 13C MAS relaxation measurements

| Binder/sample: | Parameter determined | —$CO_2$— | $C_{ar}$ | —$CH_2$— | $C_q$ | Means of determined parameters c, $T_1^s$ and $T_1^I$ |
|---|---|---|---|---|---|---|
| CC 4540-0 "AGM" (amorphous) Preliminary test comparative example 1 | $M_0$ | 2.02 | 6.49 | 1.75 | 1.06 | |
| | a | 1.00 | 1.00 | 1.00 | 1.00 | |
| | c | 0.66 | 0.81 | 0.64 | 0.64 | 0.69 |
| | $T_1^s$/s | 16 | 7.2 | 2.1 | 4.8 | 7.5 |
| | $T_1^I$/s | 73 | 45.9 | 28 | 22 | 42.2 |
| (CC 2506-1 "AGM") Preliminary test comparative example 10 | $M_0$ | 3.12 | 8.33 | 2.82 | 1.87 | |
| | a | 1.00 | 0.99 | 0.98 | 0.99 | |
| | c | 0.73 | 0.74 | 0.66 | 0.4 | 0.63 |
| | $T_1^s$/s | 12.2 | 4.4 | 1.2 | 8.3 | 6.5 |
| | $T_1^I$/s | 55.4 | 43.2 | 24.1 | 36 | 39.7 |
| (Sirales PE 7499 "AGM") Preliminary test comparative example 15 | $M_0$ | 2.28 | 6.01 | 2.09 | 1.18 | |
| | a | 1.00 | 1.00 | 0.98 | 1.00 | |
| | c | 0.79 | 0.75 | 0.65 | 0.79 | 0.75 |
| | $T_1^s$/s | 11.5 | 9.4 | 1.6 | 1.6 | 6.0 |
| | $T_1^I$/s | 71.4 | 61.1 | 35.9 | 22.8 | 47.8 |
| CC 4540-0 "Nd" Preliminary test example 1 | $M_0$ | 1.15 | 3.15 | 0.76 | 0.59 | |
| | a | 1.10 | 1.00 | 1.00 | 1.03 | |
| | c | 0.77 | 0.54 | 0.47 | 0.33 | 0.5275 |
| | $T_1^s$/s | 1.6 | 14 | 9.6 | 7.2 | 8.1 |
| | $T_1^I$/s | 93 | 140 | 83 | 77 | 98.25 |
| CC 4540-0 coated Al substrate Example 1 | $M_0$ | 7.5 | 19.8 | 2.8 | 3.4 | |
| | a | 1.002 | 0.964 | 0.95 | 1.02 | |
| | c | 0.69 | 0.76 | 0.73 | 0.65 | 0.7075 |
| | $T_1^s$/s | 14.9 | 8.8 | 0.5 | 1.3 | 6.4 |
| | $T_1^I$/s | 123 | 84.6 | 57 | 29.8 | 73.6 |
| CC 2506-1 "Nd" Preliminary test example 10 | $M_0$ | 2.49 | 6.25 | 2.11 | 1.29 | |
| | a | 1.00 | 0.99 | 0.99 | 0.99 | |
| | c | 0.73 | 0.62 | 0.72 | 0.33 | 0.6 |
| | $T_1^s$/s | 10.2 | 12.5 | 2.1 | 7.4 | 8.1 |
| | $T_1^I$/s | 105 | 103 | 50.1 | 47 | 76.3 |
| Sirales PE 7499 "ND" Preliminary test example 15 | $M_0$ | 1.79 | 4.27 | 1.58 | 0.86 | |
| | a | 1.00 | 0.99 | 0.98 | 0.99 | |
| | c | 0.68 | 0.63 | 0.75 | 0.7 | 0.69 |
| | $T_1^s$/s | 16.8 | 14.8 | 2.1 | 4 | 9.4 |
| | $T_1^I$/s | 116 | 114 | 57 | 23.4 | 77.6 |

For the evaluation, the relaxations of the $^{13}C$ nuclei of the acid groups (for short —$CO_2$—), of the aromatic group of the acid component ($C_{ar}$ for short), and also the methylene groups (for short —$CH_2$—) and the quaternary C atom (for short $C_q$) of the neopentyl alcohol component were employed in each case. The methyl groups were not used, owing to their familiar, very rapid relaxation, as is known. For the values c, $T_1^s$ and $T_1^I$ determined, the means of all individual groups were used in each case, corresponding to the usual procedure of this method.

There is a distinct difference between the short relaxation frequencies assigned to the amorphous fraction and the long relaxation frequencies assigned to the crystalline fraction. Inventive example 1 and preliminary test examples 1, 10 and 15 exhibit much higher relaxation times $T_1^I$ (73.6 to 98.25 s) than the corresponding preliminary test comparative level, it is also possible for regions with a very low order to result in high c values. Using the method, local orders in the polymer are detected from as little as around 3 to 4 unit cells.

These interpretations of the NMR findings fit very well with the results of the PXRD investigations. There, the unprecipitated samples of the preliminary test comparative examples consistently showed unstructured spectra. A pre-order of the polymers already present here was in evidence, though insufficiently pronounced in spatial terms to give signals in the Debye-Scherrer geometry. With this method, which is based on more long-distance interactions, structured signals are obtained only when there are at least around twenty unit cells of the crystalline regions present. The precipitated polymers gave clearly structured spectra in the case both of the pure polymer samples (preliminary test examples) and of the polymer precipitated onto the Al platelets (example 1). In the case of the NMR relaxation tests, the sharply increased domain size of the crystalline fractions of the precipitated polymers resulted in the higher relaxation times $T_1^I$ observed.

The invention claimed is:

1. A coated effect pigment comprising a platelet-shaped substrate and a coating applied thereon comprising a binder for powder coating having a crystalline fraction and an amorphous fraction as determined by $^{13}C$ NMR MAS relaxation measurements, the relaxation of the $^{13}C$ nuclei being fitted as biexponential relaxation according to the formula $$M(t, M_0, a, c, T_1^s, T_1^l) = M_0 \cdot \left[ (1-c) \cdot \left(1 - a \cdot e^{-\left(\frac{t}{T_1^s}\right)}\right) + c \cdot \left(1 - a \cdot e^{-\left(\frac{t}{T_1^l}\right)}\right) \right]$$

wherein c is in a range between 40% to 85%, $T_1^s$ is less than $T_1^l$, and $T_1^l$ is in a range from 65 to 130 s, and the binder comprises a polyester produced from an acid component and an alcohol component, a main fraction of the acid component being one or more of isophthalic acid and terephthalic acid, and the platelet-shaped substrate includes one or more of a metallic effect pigment, a pearlescent pigment, and an interference pigment.

2. The coated effect pigment as claimed in claim 1, wherein the $T_1^I$ is in a range from 70 to 110 s.

3. The coated effect pigment as claimed in claim 1, wherein the binder is not an LCST or UCST polymer.

4. The coated effect pigment as claimed in claim 1, wherein a powder diffractogram (PXRD) of the binder in Debye-Scherrer geometry, with a capillary of 0.3 mm diameter, has structured peaks with full widths at half maximum in the range from 0.7 to 2.0° in 2θ, using Cu Kα1 as x-ray source and using germanium(111) with a slit width of 0.5 mm as monochromator.

5. The coated effect pigment as claimed in claim 1, wherein in a DSC diagram at a rate of advance of 5° C./min, the coated effect pigment exhibits at least one endothermic peak having a maximum $T_{max}$ ranging from 100 to 150° C. and an enthalpy DH associated with the at least one endothermic peak ranging from 15 J/g to 80 J/g, the enthalpy being calculated on the amount of the binder.

6. The coated effect pigment as claimed in claim 1, wherein the binder is prepared via a melt polymerization.

7. The coated effect pigment as claimed in claim 1, wherein the binder comprises a polyester produced from at least 14 mol % of isophthalaic acid, based on a total of the acid component used to produce the polyester.

8. The coated effect pigment as claimed in claim 1, wherein the binder comprises a polyester produced from 50 to 100 mol % of one or more of neopentyl glycol and 2-butyl-2-ethyl-1,3-propanediol, based on a total of the alcohol component used to produce the polyester.

9. The coated effect pigment as claimed in claim 8, wherein the alcohol component has a molar ratio of less than 20% of ethylene glycol to the one or more of neopentyl glycol and 2 butyl-2-ethyl-1,3-propanediol.

10. The coated effect pigment as claimed in claim 9, wherein the platelet-shaped substrate is a pearlescent pigment or is a metallic effect pigment coated with a metal oxide.

11. The coated effect pigment as claimed in claim 10, wherein the platelet-shaped substrate is the metallic effect pigment and the metal oxide includes one or more of silicon oxide, silicon dioxide, silicon oxide hydrate, silicon hydroxide, aluminum oxide, aluminum oxide hydrate, and aluminum hydroxide.

12. A composition comprising the coated effect pigment according to claim 1, the composition is in the form of a coating composition.

13. A composition comprising the coated effect pigment according to claim 1, the composition is in the form of a paint.

14. A composition comprising the coated effect pigment according to claim 1, the composition is in the form of a powder coating composition.

15. A composition comprising the coated effect pigment according to claim 1, the composition is in the form of a printing ink.

16. A composition comprising the coated effect pigment according to claim 1, the composition is in the form of a toner.

17. A composition comprising the coated effect pigment according to claim 1, the composition is in the form of a plastic composition.

* * * * *